United States Patent
Asbjornsen et al.

(10) Patent No.: US 11,386,141 B1
(45) Date of Patent: Jul. 12, 2022

(54) MULTIMEDIA MANAGEMENT SYSTEM (MMS)

(71) Applicants: Kelline Asbjornsen, Tualatin, OR (US); Steven Asbjornsen, Tualatin, OR (US); Tom Widdows, Tigard, OR (US)

(72) Inventors: Kelline Asbjornsen, Tualatin, OR (US); Steven Asbjornsen, Tualatin, OR (US); Tom Widdows, Tigard, OR (US)

( * ) Notice: Subject to any disclaimer, the term of this patent is extended or adjusted under 35 U.S.C. 154(b) by 527 days.

(21) Appl. No.: 15/412,324

(22) Filed: Jan. 23, 2017

Related U.S. Application Data

(60) Provisional application No. 62/288,816, filed on Jan. 29, 2016, provisional application No. 62/286,827, filed on Jan. 25, 2016.

(51) Int. Cl.
| | | |
|---|---|---|
| *G06F 16/48* | (2019.01) | |
| *G06F 16/958* | (2019.01) | |
| *G06F 16/28* | (2019.01) | |
| *G06F 16/35* | (2019.01) | |
| *G06F 16/14* | (2019.01) | |

(52) U.S. Cl.
CPC ............ *G06F 16/48* (2019.01); *G06F 16/148* (2019.01); *G06F 16/285* (2019.01); *G06F 16/35* (2019.01); *G06F 16/958* (2019.01)

(58) Field of Classification Search
CPC .... G06F 16/148; G06F 16/958; G06F 16/285; G06F 16/35
USPC .. 707/737, 736, 823, 17.009, 17.01, 17.143, 707/999.007, 999.102
See application file for complete search history.

(56) References Cited

U.S. PATENT DOCUMENTS

| | | | | |
|---|---|---|---|---|
| 2002/0055924 | A1* | 5/2002 | Liming | .................. H04L 67/18 |
| 2003/0004968 | A1* | 1/2003 | Romer | ................ G06F 16/5846 |
| 2006/0069998 | A1* | 3/2006 | Artman | .................. G06F 16/907 |
| | | | | 715/721 |
| 2006/0161635 | A1* | 7/2006 | Lamkin | ................ G06F 16/4387 |
| | | | | 709/217 |
| 2007/0294300 | A1* | 12/2007 | Nozaki | ................ G11B 27/034 |

(Continued)

OTHER PUBLICATIONS

Winston, Rudy, "Adding Copyright Information to Your Images", Article, Sep. 24, 2013, pp. 1-5; http://learn.usa.canon.com/resources/articles/2013/adding_copyright_information.shtml.

(Continued)

*Primary Examiner* — Tony Mahmoudi
*Assistant Examiner* — Kamal K Dewan
(74) *Attorney, Agent, or Firm* — Schwabe Williamson & Wyatt

(57) ABSTRACT

A multimedia management system (MMS) manages media acquisition, storage and retrieval, quickly retrieving relevant media records with minimal effort and may also provide controlled and/or restricted on-line access to media records. The reduction in effort to control, manage and access information rich media allows the use of media to become a more efficient and prolific means of general media documentation for intra- and inter-communication between entities such as businesses, government organizations, and institutions, as well as for individuals. Moreover, the system also provides media acquisition aids, acquisition device management aids and display aids that further improve the efficiency of accessing relevant media in a timely manner further reducing barriers to using digital media as a practical media documentation tool.

21 Claims, 24 Drawing Sheets

(56) References Cited

U.S. PATENT DOCUMENTS

| | | | |
|---|---|---|---|
| 2008/0090513 A1* | 4/2008 | Collins | H04H 60/65 |
| | | | 455/3.01 |
| 2008/0195664 A1* | 8/2008 | Maharajh | H04W 4/06 |
| 2008/0306921 A1* | 12/2008 | Rothmuller | G06F 16/958 |
| 2009/0319472 A1* | 12/2009 | Jain | G11B 27/105 |
| 2010/0042660 A1* | 2/2010 | Rinearson | G06F 16/748 |
| | | | 707/E17.116 |
| 2010/0083173 A1* | 4/2010 | Germann | G06F 16/164 |
| | | | 715/810 |
| 2011/0264495 A1* | 10/2011 | Hailey | G06F 3/0482 |
| | | | 705/14.16 |
| 2012/0323938 A1* | 12/2012 | Skeen | H04L 65/4069 |
| | | | 707/754 |
| 2014/0096032 A1* | 4/2014 | Mayblum | H04L 51/22 |
| | | | 715/752 |
| 2014/0250131 A1* | 9/2014 | Morton | G06F 16/31 |
| | | | 707/746 |
| 2014/0337346 A1* | 11/2014 | Barthel | G06F 16/435 |
| | | | 707/738 |
| 2016/0012078 A1* | 1/2016 | Kutner | G06F 16/48 |
| | | | 707/722 |
| 2016/0062992 A1* | 3/2016 | Chen | G06F 16/43 |
| | | | 707/736 |
| 2016/0259862 A1* | 9/2016 | Navanageri | G06F 16/955 |
| 2016/0349949 A1* | 12/2016 | Miller | G06F 40/186 |
| 2017/0052662 A1* | 2/2017 | Smith, Jr. | G06F 16/252 |
| 2017/0139915 A1* | 5/2017 | Dauderman | G06F 16/907 |
| 2017/0251261 A1* | 8/2017 | James | H04N 21/2393 |
| 2018/0276282 A1* | 9/2018 | Ma | G06T 11/206 |
| 2019/0107906 A1* | 4/2019 | Berry | H04N 21/00 |

OTHER PUBLICATIONS

FotoIN Mobile; FotoIN Presentation; YouTube; Jan. 14, 2014, https://www.youtube.com/watch?v=YTjX6xZ4MHs.

* cited by examiner

MULTIMEDIA MANAGEMENT SYSTEM (MMS)

The present patent application claims priority to U.S. Provisional Patent Application, Ser. No. 62/286,827, filed Jan. 25, 2016, entitled MEDIA PRETAGGING and U.S. Provisional Patent Application, Ser. No. 62/288,816, filed Jan. 29, 2016, entitled MOBILE MEDIA MANAGEMENT SYSTEM which are both herein incorporated by reference in its entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to a multimedia management system (MMS).

BACKGROUND

The ability to collect media acquired from a variety of devices, such as smartphones, tablets, notebook PCs, or the like, is simple and often prolific, creating large collections of content that become difficult for businesses and consumers to manage. The cost and time involved with systematically storing and accessing content is often prohibitive. While systems for accommodating storage of larger collections of media have evolved quickly in the form of cloud services, terabyte storage drives, etc., the challenge of finding relevant content within huge bodies of media files has not evolved materially. Software systems are available today that accommodate the storage and retrieval of media into and from standard file hierarchies and file databases based on file folders, file folder names, file names and automated file tagging using machine generated metadata such as time, date and geolocation.

More recently, time and date stamps traditionally captured in media file names have been augmented with geo coordinate tags to allow pictures to be automatically sorted by the location where the pictures were acquired. The pictures are then typically presented as "pins" in a map. This is a step forward but insufficient to address common business and institutional needs. For example, thousands of pins over a high-rise apartment building do not help a property manager identify which pins belong to which apartment. Further, audio recordings taken in conjunction with pictures often capture tenant noise or malfunctioning appliances and won't appear any different than any other pin, if they appear at all.

Another challenge with machine-generated metadata is that the person seeking specific media files must correlate a media topic of interest with those parameters, which may or may not be either intuitive or precise enough to be useful. For example, identifying a specific picture among hundreds of pictures taken during a weeklong vacation 3 years ago is aided by machine-generated metadata but may still leave a person reviewing hundreds if not thousands of files to find the content of interest.

There are also systems that allow users to add their own metadata to existing media files (often referred to as "tagging") to provide more robust indexing for creating an additional level of convenience in retrieving relevant media. Unfortunately, the process and effort required to implement and manage incremental metadata often exceeds the perceived value since the tangible time investment in the present for an uncertain and non-specific need in the future is often questionable and/or easily put off indefinitely.

While the proliferation of mobile devices and cloud-based storage systems has made it easier than ever to acquire and store multiple types of media, the efficiency of retrieving media of interest has not advanced enough to make the value of documenting events, status, work outcomes, etc. (hereafter referred to as media documentation) a common practice.

There remains a considerable need for a system and methods that materially reduces the cost, time and effort in managing multiple types of media. Providing a means to efficiently access relevant media content allows for the expanded use of media documentation in a wider range of both business and personal use providing information granularity and precision previously considered impractical.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 9g illustrates a media matrix for four media records without a time gap bar, generated with the exemplary flow diagram in FIG. 8a.

DETAILED DESCRIPTION

A multimedia management system (MMS) is typically a private system that manages digital media acquisition, storage and retrieval, quickly retrieving relevant media records with minimal effort and may also provide controlled and/or restricted on-line access to media records. The reduction in effort to control, manage and access information rich media allows the use of media to become a more efficient and prolific means of general media documentation for intra- and inter-communication between entities such as businesses, government organizations, and institutions, as well as for individuals. Moreover, the system also provides media acquisition aids, acquisition device management aids and display aids that further improve the efficiency of accessing relevant media in a timely manner, further reducing barriers to using digital media as a practical media documentation tool.

The MMS adds value to businesses and consumers by simplifying management of media acquired on a variety of devices. Acquired media can include, but is not limited to, alpha/numeric entries, voice recordings, pictures, and/or videos. Devices in this context includes, but is not limited to; smartphones, tablets, notebook PCs. or the like, or any combination thereof.

Some embodiments are directed to a system and methods for using an automated hierarchical semantic metadata tagging schema and a network to manage the acquisition, storage, retrieval, display, access, and key-based private sharing for all types of digital media with minimal user intervention.

In one example, a media management service manages the general operation of a given multimedia management system, including hierarchical tagging, across a network and an echo mode service that supports automated private sharing of media records between multimedia management systems.

The multimedia management service can include, but is not limited to, management of media acquisition, storage, user authentication, user permissions, media sharing keys, media acquisition devices, system settings and implementation of a hierarchical metadata tagging schema. The multimedia management service can be implemented as a cloud based service or deployed on local servers. The echo mode service manages automatic sharing of digital media between multimedia management systems including control of metadata modifications that protect metadata privacy and manage differences in semantic tagging between systems. The echo mode service can be located anywhere in the system including integration into the multimedia management service or as a standalone service for connecting multimedia management systems hosted independently.

Figure 1A:
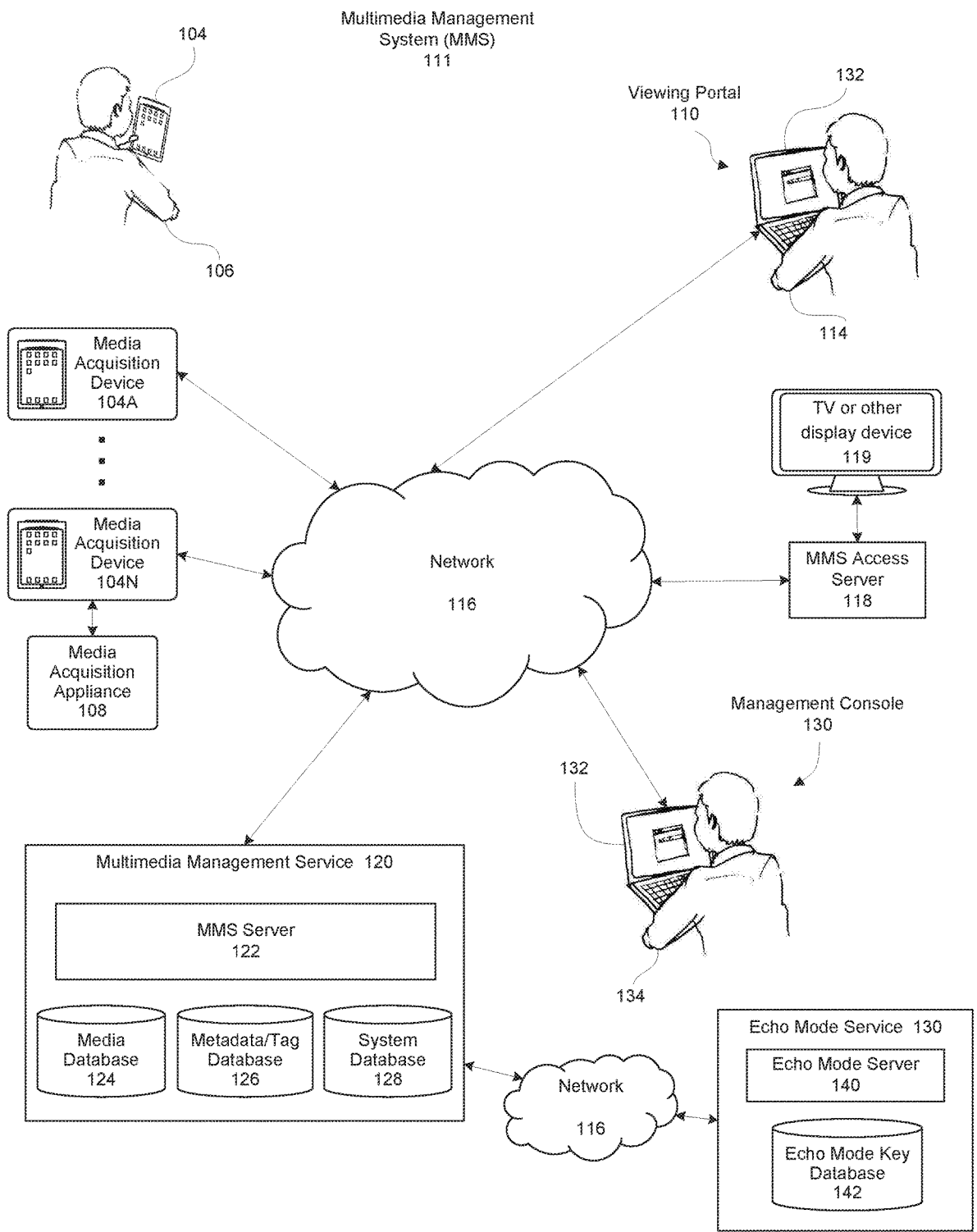
FIG. 1a is a block diagram illustrating an exemplary system architecture for a multimedia management system (MMS) using a network.

FIG. 1a is a diagram illustrating an exemplary system architecture for a multimedia management system, MMS 111, using a network 116. System architecture comprises users 106 authorized to acquire media using any number of media acquisition devices 104A-104N connected to a wide area network 116 such as any combination of the internet, local area networks (LANs), wireless networks, telephone networks, etc. The system architecture also may include media acquisition appliances 108 that rely on connection to other devices such as, but not limited to, media acquisition devices or PCs for access to wide area network 116, a multimedia management service 120, a management console 130 for administrator class users 134 with authorization to configure the system using common compute capable devices 132 such as, but not limited to, PCs, tablets and smartphones; an MMS access server 118 connected to a TV or other display device 119 to provide manual or automated access to acquired media; a viewing portal 110 for guest users 114 providing viewing access only or additionally authorizing download access using common compute capable devices 132 to authorized media that has been stripped of any potentially sensitive metadata; an echo mode service 130 that distributes acquired media to more than one multimedia management system and automatically manages metadata within each system to accommodate metadata privacy and differences between metadata tagging schema in each multimedia management system.

Oversight and coordination of the overall multimedia management system 111 is provided by the multimedia management service 120 comprising the media database 124, metadata/tag database 126, and system database 128 and MMS Server 122 provides.

Figure 1B:
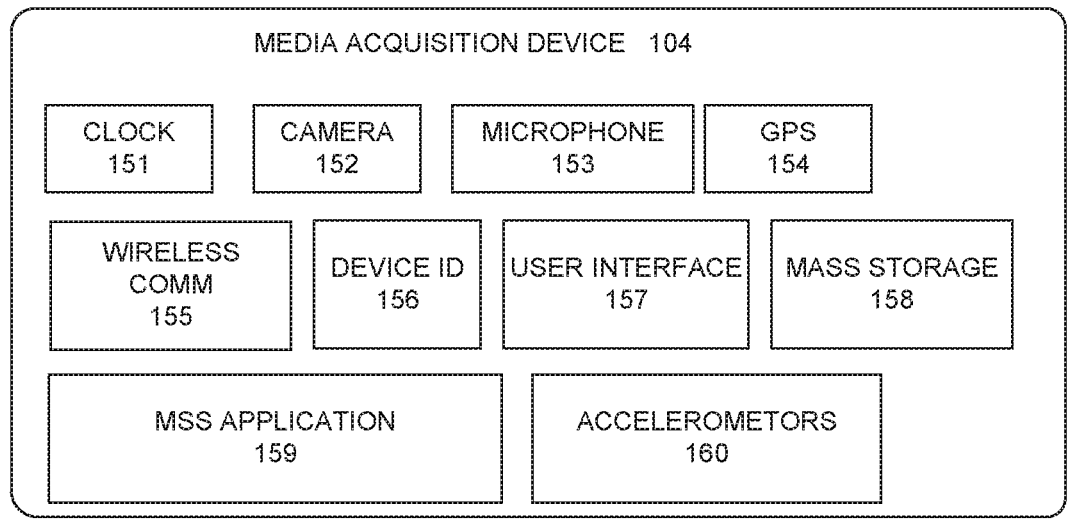
FIG. 1b shows block diagrams representing a typical media acquisition device and typical mobile appliance.
Figure 1B:
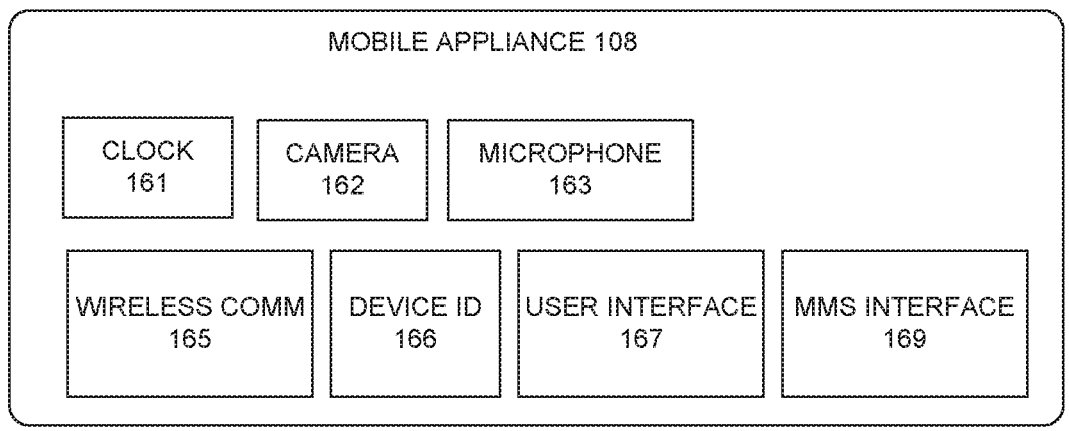

Referring to FIGS. 1a and 1b, the metadata/tag database 126 tracks all forms of metadata which may be used by the system and/or assigned to media records such as, but not limited to: information collected from media acquisition device 104 sensors such as, but not limited to, date stamps from an internal clock 151 and geospatial information from a GPS 154, information collected about the media acquisition device 104 such as, but not limited to, model number, software version, device ID 156 which may include, but is not limited to, the model number and the International Mobile Equipment Identity (IMEI); ID of user who acquired a media record, as well as user entered semantic tags at every level of a tiered metadata tag hierarchy described herein further down. Moreover, some or all of the metadata may also be embedded within records as well. The media database 124 stores and manages all media records and the system database 128 manages all other functions of the system including, but not limited to, synchronizing with a local cache of media acquisition devices 104 that may have operated off-line, tracking viewing portal 110 access keys described below and tracking access and contribution permissions.

Media acquisition devices 104 can be fixed or mobile typically comprising a network interface either wired or wireless 155 such as but not limited to WiFi, Bluetooth and/or cellular modem, a clock 151 supporting time and date, facilities for running one or more multimedia management system applications 159, memory supporting but not limited to application execution, media storage and a cache for off-line operation, a user interface 157, and sensors which may include, but are not limited to; a camera 152, microphone 153, GPS 154 and accelerometers 160 for generating media and metadata.

The media acquisition appliance 108 is typically a device for acquiring media that does not have the resources or compute and/or communication capabilities to act as a standalone media acquisition device 104 but can support media acquisition through connection to a media acquisition device 104. In one example, a high-resolution digital single lens reflex camera that does not have the ability to directly connect with the network 116 but has a wireless 165 Bluetooth connection to a media acquisition device 104 and a user interface 167 that allows convenient access to common MMS selections and functions such as, but not limited to, metadata tags and media record acceptance or rejection for transfer to the multimedia management system through MMS interface 169 that manages interactions between the media appliance 108 and the media acquisition device 104.

A block diagram of mobile appliance 108 is shown in FIG. 1b and is typical of devices dedicated to media acquisition that may not have direct access to the network 116 such as, but not limited to, a dedicated camera, a Dictaphone, or electronic notepad that supports media acquisition through sensors such as, but not limited to, a camera 162 and/or microphone 163, a user interface 167 to support user entry and selections, an MMS interface 169 to manage interactions between the media appliance 108 and the media acquisition device 104 and typically either wired or wireless short- to medium-range communication link 165 to a media acquisition device 104 or general compute device 132.

(HIERARCHICAL TAGGING) The MMS 111 can use a hierarchical tagging process for assigning metadata tags to digital media pre- and/or post-acquisition to facilitate media acquisition, storage and retrieval. A notable attribute of tagging all media records with a semantic tier-1 primary tag, and subtags, is the ability to perform media record searches without regard to their storage location or file name. A search for media records with a common primary tag can even span multiple storage locations with no impact on the user's involvement in performing the search.

Figure 2:
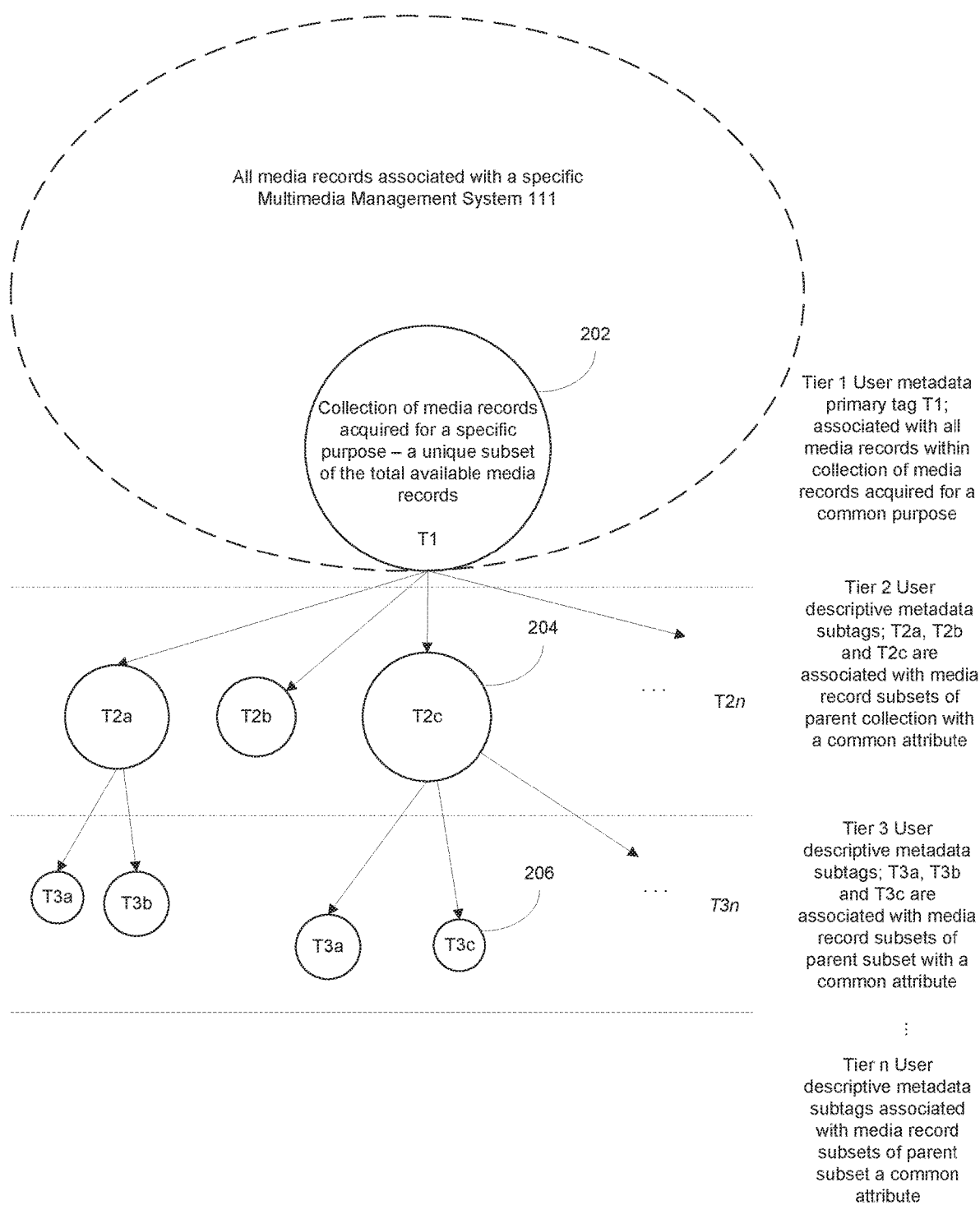
FIG. 2 shows a hierarchical schema of user-provided metadata tags where each media record can be assigned at least one metadata tag from each tier.

FIG. 2 shows a hierarchical schema of user-provided metadata tags where each media record can be assigned at least one metadata tag from each tier. The highest level of segmentation is created by a tier-one class of metadata tags 202 herein referred to as primary tags. The primary tag is a primary semantic identifier that provides relevance to the user such as, but not limited to, a customer name, address, invoice number, case number, and the like. Typically, one instance of a tier-one tag is assigned to a media record within a specific MMS 111.

A second-tier class of metadata tags 204, herein referred to as subtags, may be assigned to individual media records that create distinctions within the collection of media assigned to tier-one tags. For example, a property management company typically documents the condition of a rental unit prior to occupancy. In this case the property address could be used as a relevant primary tag (tier one). Names of rooms, such as living room, dining room, etc., could be assigned as subtags (tier two) providing additional information about each media record.

A third-tier class of metadata subtags 206 and additional tiered metadata subtags can be added to provide increasing granularity to media searches. Using the prior example, the property management company could assign an additional subtag (tier three) to identify any rooms in the unit that show damage, wear, repair needed, etc. Typically, only one primary tag is assigned to a media record. A similar approach of assigning only one tag per tier to enforce a strict hierarchical tagging structure may also be adopted.

MMS 111 allows for creating collections or lists of metadata tags that provide specific relevance to a corresponding media documentation activity. For instance, a list of metadata tags used when documenting media for a property manager may differ from a list of metadata tags used when documenting media for an electrical installation. Multiple media documentation activities may necessitate using more than one list of metadata tags.

(MEDIA BUCKETS) MMS 111 accommodates multiple metadata tag lists using a logical construct herein referred to as media buckets. Each media bucket comprises a designated storage location with an assigned metadata tag list. Media buckets can be implemented without a hierarchical tagging structure however, when using a hierarchical tagging structure, the metadata tag list would typically be a subtag list. The remainder of this section assumes the use of a hierarchical tagging structure and refers to corresponding metadata tag lists as subtag lists. Each subtag list is a user-managed collection of metadata relevant to a corresponding type of media documentation activity. Media buckets can also be used to control access to media records stored within them.

For example, a roofing and siding business can label one media bucket 'Roofing' and assign a subtag list relevant to roofing activities. Another media bucket can be labeled 'Siding' and assigned a subtag list relevant to siding activities. An employee that performs both types of work can select a primary tag identifying the specific work location and the media bucket appropriate to the type of work to be performed. The employee is then presented with the appropriate subtag list for the type of work being done and all the media acquired while performing the work will go into the selected media bucket. If an employee is only trained in one type of work, such as roofing, they may or may not have access to the siding media bucket and/or the media records stored in it, depending on the configuration policy adopted by the business. If the business expands to include another operation such as window installations, a third media bucket can be added in a similar manner for documenting window installations.

Figure 3:
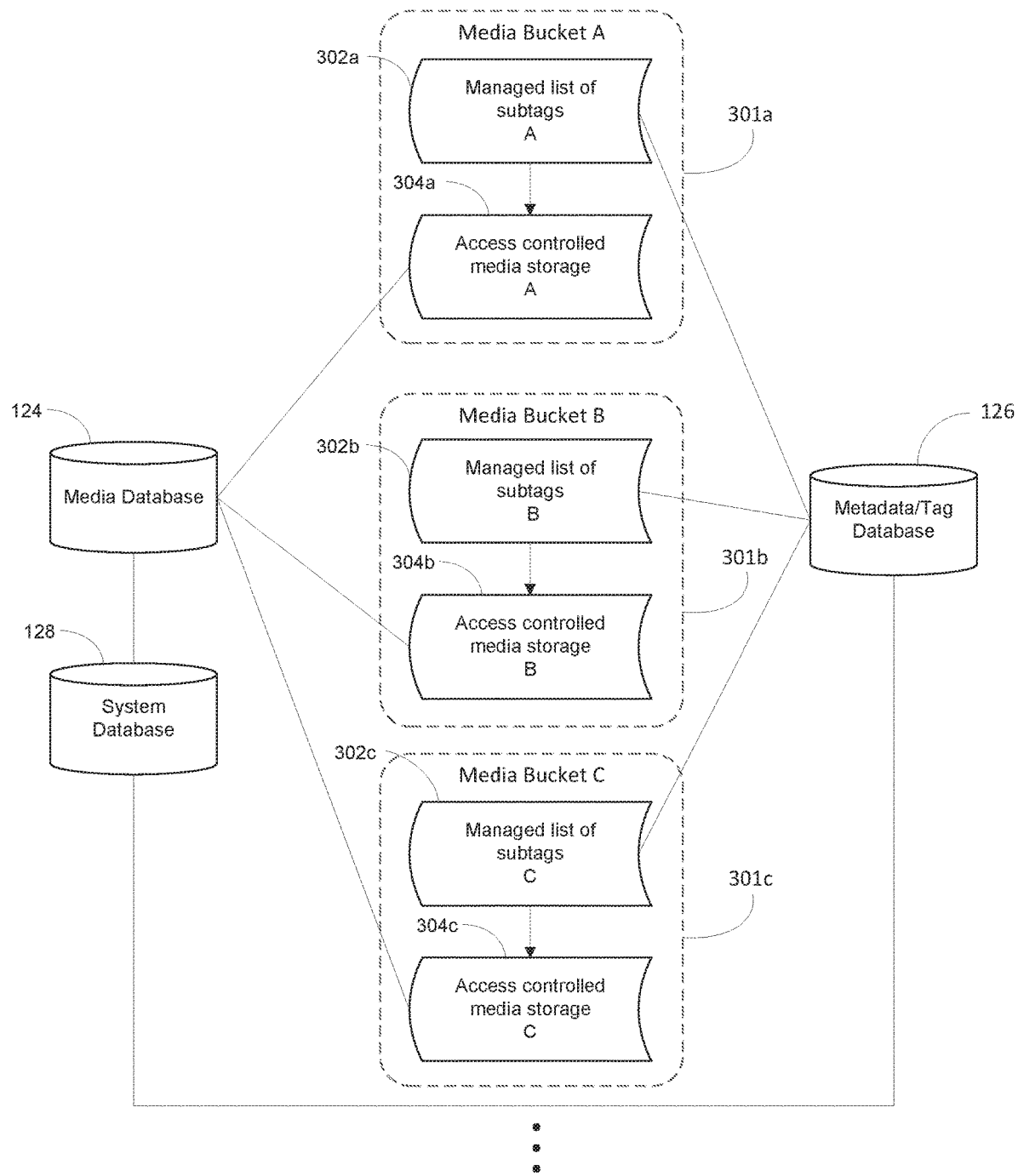
FIG. 3 shows a diagram illustrating the construct of media buckets to support multiple media documentation activities.

FIG. 3 shows a diagram illustrating the construct of media buckets to support multiple media documentation activities. Using the prior example, the business could designate one media bucket (A) 301a for roofing media documentation to be stored in an access controlled media storage location 304*a*, and create a subtag list 302*a* with descriptors that can be used to add specific details relevant to the roofing activity.

The business could designate a second media bucket (B) 301*b* for siding media documentation to be stored in an access controlled media storage location 304*b*, and create a subtag list 302*b* with descriptors that can be used to add specific details relevant to the siding activity, and designate a third media bucket (C) 301*c* for window media documentation to be stored in an access controlled media storage location 304*c* and create a subtag list 302*c* with descriptors that add specific details relevant to the window activity.

Subtag lists for media buckets may be stored and managed within a metadata/tag database 126. Subtag descriptors are saved with each media record and may be stored collectively in a media database 124. Media bucket designations and client associations may be stored within system database 128.

MMS 111 uses a process herein referred to as pre-tagging to facilitate selection of user-entered metadata, such as primary tags and subtags, prior to subsequent media acquisitions so that the selected metadata is automatically assigned to subsequent media records during acquisition.

(PRE-TAGGING) Pre-tagging allows users to enter or select one or more metadata tags before media documentation begins, such as but not limited to a customer name, address, invoice number, case number, and the like. The metadata tags are then automatically assigned to all subsequently acquired media. The automatically assigned metadata tags make it practical to implement uniform media tagging thus allowing a search by metadata tag to become a material factor in simplifying future media record retrieval and reporting. Metadata tags can be entered into the system in a number of ways, including but not limited to: entered in advance from a centralized location using a management console 130 by administrators 134, scanned entry from a document using a barcode, QR (Quick Response) code, or automated metadata keying from scanned images as a direct or indirect form of metadata tag entry, or entered directly into a mobile acquisition device 104 while on site.

When using a hierarchical tagging structure, one primary tag is typically attached to every media record and selected subtags are applied to associated media records. For example, a subtag may be manually entered or pre-selected by a user and then automatically applied to all subsequently acquired media records until another subtag is manually selected. In another example, a processor in the media acquisition device 104 may automatically select one of the subtags based on a location of the media acquisition device 104 relative to location identifiers assigned to the subtags.

Figure 4A:
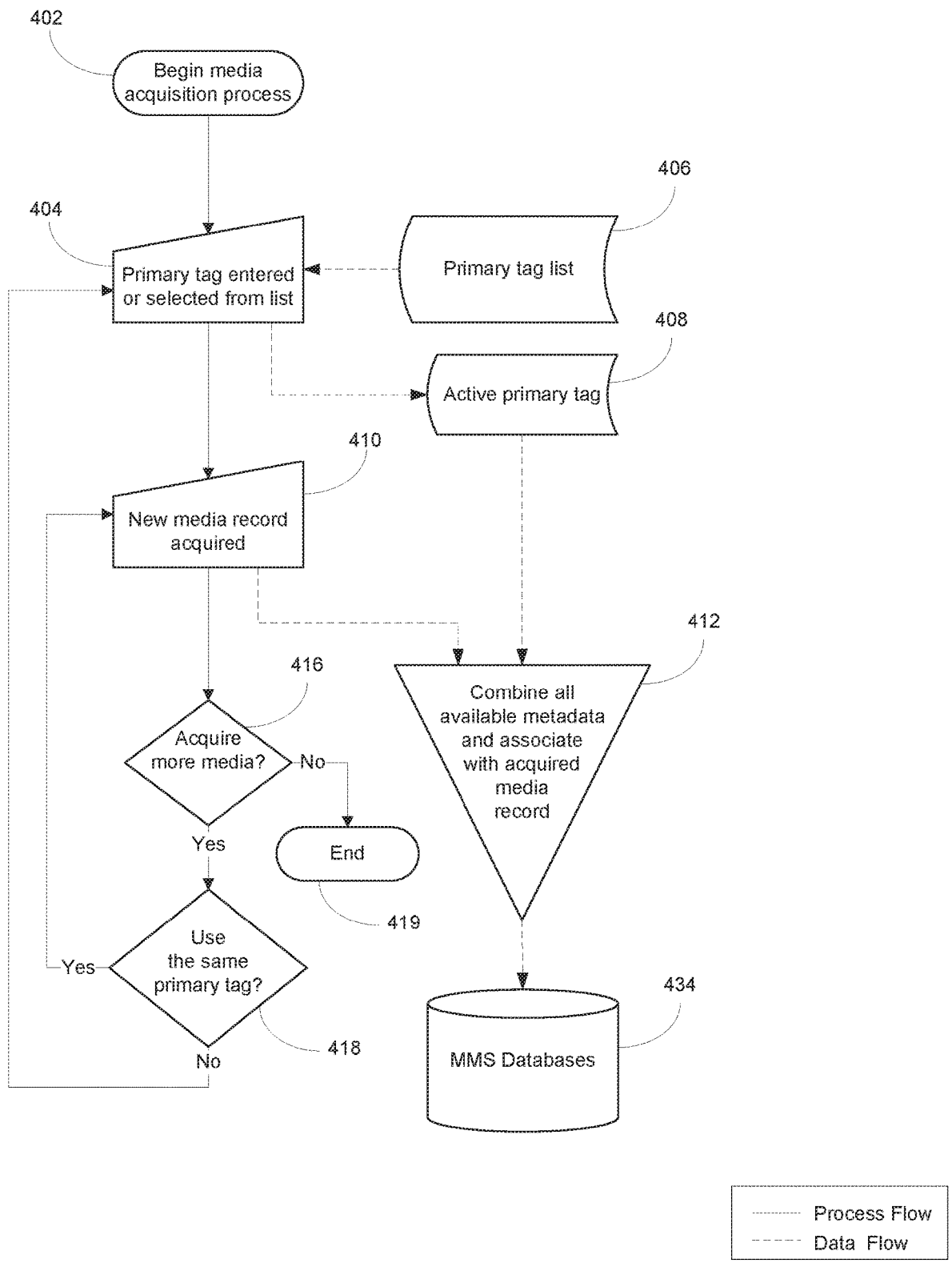
FIG. 4a shows a flow diagram describing a simple embodiment of pre-tagging within the media acquisition process.

FIG. 4*a* shows a flow diagram describing a simple embodiment of pre-tagging within the media acquisition process. The process begins with block 402, where the process immediately proceeds to block 404. In block 404 the metadata tag is entered or selected. For example, the metadata tag could be entered on a mobile device via an alpha-numeric keyboard, selected from a metadata tag list 406, scanned from a bar code, or the like.

After a metadata tag is entered or selected, the metadata tag is designated as active and placed in a temporary storage location 408. The user initiates a new media acquisition 410 such as taking a photo, video and/or audio recording, or the like.

Acquired media record is automatically assigned all associated metadata 412 comprising the user-entered or selected metadata tag and device-generated metadata such as but not limited to date, time, GPS coordinates or any combination thereof. The media record and assigned metadata are then saved to MMS databases 434 comprising system database 128, metadata/tag database 126 and/or media database 124.

In operation 416 the option is presented to continue or end the acquisition process 419. If process continues, operation 418 presents the option to use the same primary tag or enter/select a different primary tag before acquiring the next media.

Figure 4B:
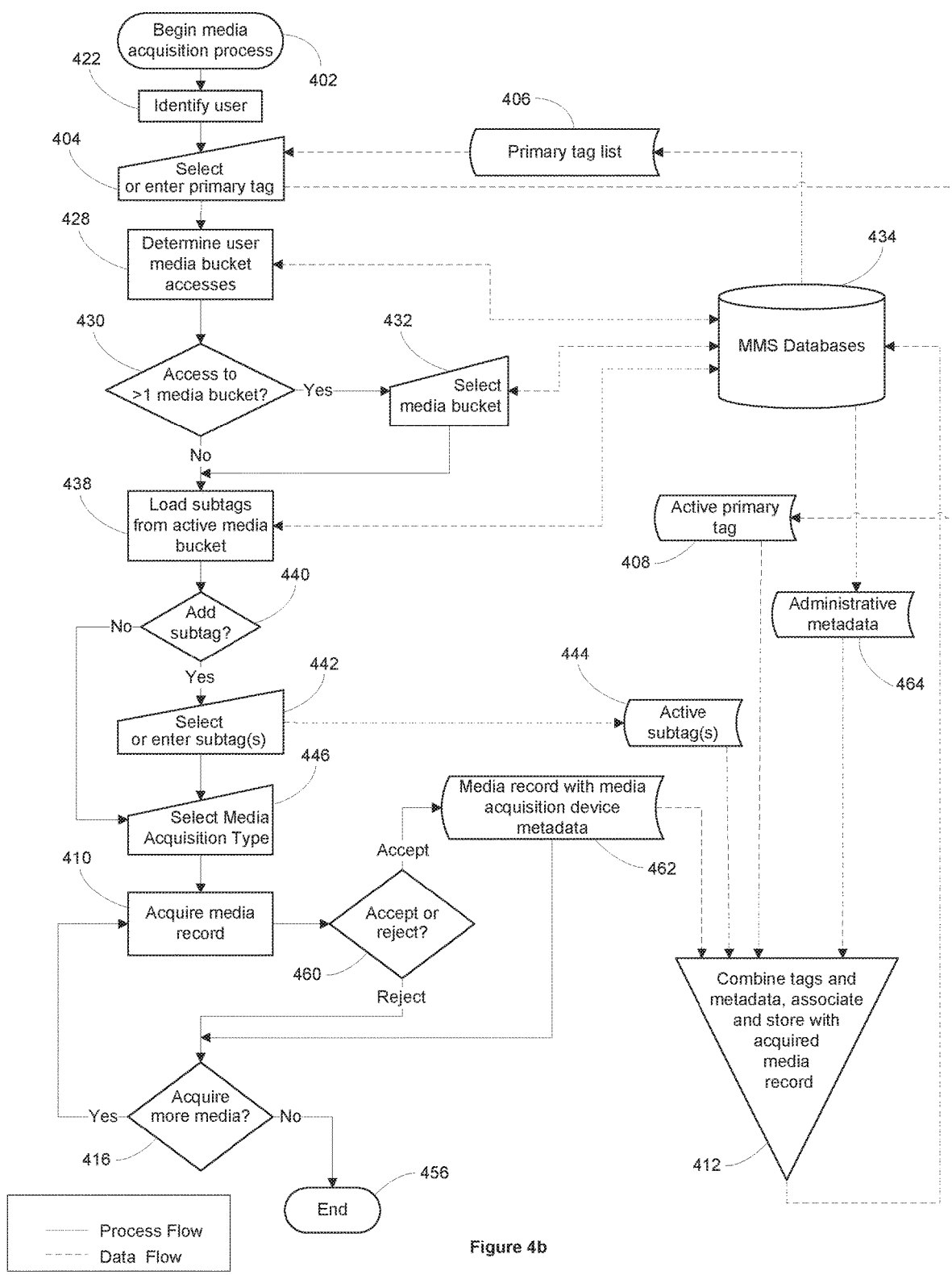
FIG. 4b shows a flow diagram describing a preferred embodiment of the pre-tagging media acquisition process incorporating the use of system generated metadata, media buckets and a hierarchical tagging structure with primary tags and subtags.

FIG. 4*b* shows a flow diagram describing a preferred embodiment of the pre-tagging media acquisition process incorporating the use of system generated metadata, media buckets and a hierarchical tagging structure with primary tags and subtags.

The process begins with block 402, where the process immediately proceeds to block 422. In block 422 the user is identified and/or authenticated using one of the many common means including, but not limited to, detection of a user dedicated device, a login process entering a user ID, password, fingerprint scan, or the like, or any combination thereof.

In block 404 a primary tag for a new or existing record is selected or entered. For example, a primary tag, such as an invoice number, could be entered on a mobile device via an alpha-numeric keyboard, or a primary tag could be selected from a list 406 of primary tags provided by MMS databases 434, scanned from a bar code, or the like. After a primary tag is entered or selected, the primary tag is designated as active and placed in a temporary storage location 408.

In operation 428 the user's identity is used to determine the user's access to available media buckets. If the user has access to more than one media bucket 430, the user is asked to select the appropriate media bucket 432.

Once the media bucket is selected 432, the MMS 111 provides an assigned subtag list 438. In operation 440, an option is provided to enter or select a subtag from the subtag list. If subtag is selected 442, the selected subtag is placed in a temporary storage location 444 and designated as the active subtag.

Media acquisition type such as, but not limited to, photo, video, audio recording, etc. is selected 446 activating the appropriate media acquisition mode. Media record is acquired 410, user accepts or rejects the media record 460, if accepted, the media record is temporarily stored 462 waiting merge with other relevant metadata.

Media record with device generated metadata, such as but not limited to, date, time, GPS coordinates 462, is automatically combined 412 with user-entered metadata such as primary tag 408, subtag 444, or the like, and administrative metadata such as, but not limited to, client account, user identification, device identifiers, or the like, or any combination thereof 464 provided by the MMS databases 434. The media record with the metadata superset is then saved to MMS databases 434.

In operation 416, option is presented to continue or end the acquisition process 456. If acquisition process continues, the user may choose to continue using the same combination of primary tag, subtag and media bucket or change to any combination thereof.

MMS 111 can use metadata tags as a means to produce an interactive media documentation list that prompts users to acquire a specified set of required media. The metadata tag media documentation list can be an unstructured list of metadata tags or, when implemented in a system using a hierarchical tagging structure, the metadata tag list is typically a subtag list of required media documentation for each primary tag. For simplicity, the remainder of the topic on required media assumes the use of a hierarchical tagging structure, media buckets and pre-tagging. For example, the MMS may prompt a service technician to enter a primary tag, such as a work order number, for a specific repair task and then present a subtag list indicating aspects of the repair task that must be documented which may include, but is not limited to, pictures before, after, or between different repair or installation phases. Selecting a subtag on the required media list will automatically launch the corresponding media capture mode and using pre-tagging, automatically assign the primary tag and subtag to the saved media record. The required media list can accommodate multiple media types and may be modified as needed.

Figure 5:
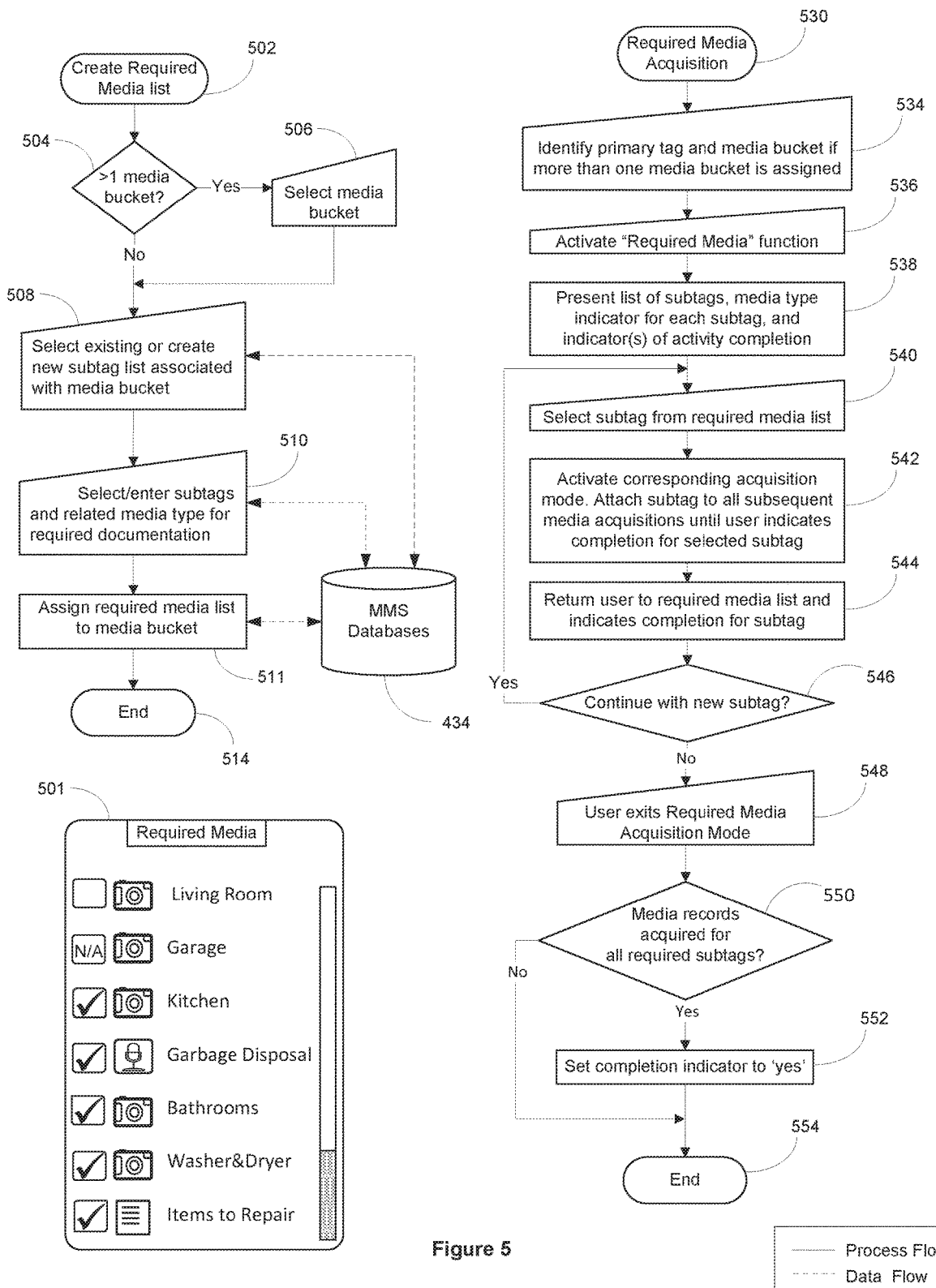
FIG. 5 provides an illustration of an exemplary required media list and flow diagrams describing methods for creating and/or utilizing a required media list used with a media documentation activity.

(REQUIRED MEDIA LIST) FIG. 5 provides an illustration of an exemplary required media list 501 and flow diagrams describing methods for creating 502 and using 530, a required media list to be used with a media documentation activity.

In operation 502, system admin 134 initiates the process for creating a list of required media. In operation 504, MMS is queried to determine if the system is configured for more than one media bucket. If so, admin 134 identifies the media bucket to be used 506.

If a subtag list has not previously been assigned to the media bucket, a new subtag list associated with the media bucket is created 508 either by selecting subtags from a pre-defined subtag template or by manually entering subtag names from an alpha-numeric keyboard, or any other form of data entry. In operation 510, the required media list is compiled by selecting the subtags from the established subtag list that identify media acquisitions considered essential to address a minimum scope of media documentation and identifying specific type of media to be acquired for each subtag. If a media bucket was selected in operation 506, the required media list is assigned to the selected media bucket 511, stored in MMS databases 434, and process is completed 514.

In block 530, a media acquisition process using a required media list is initiated. In operation 534, primary tag is entered on a media acquisition device 104 using common methods such as, but not limited to, via an alpha-numeric keyboard, selected from a list provided by metadata/tag database 126, scanned from a bar code, or the like, and MMS 111 prompts user to select a media bucket if more than one media bucket is available.

In operation 536, the required media function is activated on media acquisition device 104 and MMS 111 presents a required media list of subtags with corresponding acquisition types 538.

Diagram 501, illustrates an example of a required media list where media documentation for selected primary tag must include: photos of living room, garage, kitchen, bathrooms, washer/dryer; audio recording of garbage disposal; and note listing items to repair. Any item can be flagged as not applicable when appropriate. Indicators such as, but not limited to, check marks may be present showing media acquisition requirement has been satisfied (completed) in previous interactions with the required media list for a given event.

When a subtag is selected from the required media list 540, the corresponding media acquisition mode on the media acquisition device 104 is activated 542 and one or more media records can be acquired, with each media record being tagged with the required media subtag and other relevant metadata as described in FIG. 4*b* and stored in the MMS databases 434. When user indicates the scope of media documentation for the required media subtag is sufficient, the required media list is again presented to the user 544 and the required media subtag just completed is highlighted with an indicator showing the required media subtag item has been addressed.

MMS 111 may provide the option to capture additional media types not listed for a given subtag without having to exit the required media acquisition process. For instance, if a specific subtag on the required media list requires a photo of a bathroom and the user wants to add an audio recording to document a noisy ceiling fan, MMS 111 provides a means to add an audio recording using the bathroom subtag without having to exit the required media acquisition process. Optional media types may be accessed by an action such as a persistent selection of a subtag on the required media list until a list of optional media types appear. Selecting the audio media type would activate the corresponding acquisition mode. The required media list could then be updated to reflect both completed photo and audio recordings for the bathroom.

User may choose to continue the required media acquisition process 546 by changing the media type or selecting another subtag 540 from the required media list, or user can choose to exit the required media acquisition process 548.

MMS 111 checks for completion of all required media records 550 prior to exiting the required media acquisition process. When all media documentation requirements are satisfied, MMS 111 sets a flag to indicate media acquisition requirements are complete 552 and process ends 554.

(VIEWING PORTAL) Using a system-generated access key, MMS 111 may extend privileges to a guest user granting secured access to media records, herein referred to as "viewing portal" privileges. Access can be limited and controlled by specifying any combination of primary tags, media buckets and subtags within a private, multimedia management system. Viewing portal privileges may be defined to include view-only access or allow for both view and download access relative to the specified collection of media records.

For example, a charitable organization facilitating support for needy children through sponsors, may use MMS 111 to create a photo diary for each child to be shared with the child's sponsor. The charitable organization would identify media records associated with a sponsored child by selecting a primary tag associated with the child's location, media bucket containing media of children, and/or subtag for a specified child. A request is then submitted to MMS 111, to assign viewing portal privileges to the sponsor.

Viewing portal access is initiated by specifying media records to which sponsor will have access. MMS 111 creates login credentials for granting viewing portal privileges and generates a unique viewing portal access key. The charitable organization forwards the viewing portal access key to the sponsor, typically in the form of an alphanumeric string of characters. After successfully logging into MMS 111 using the viewing portal access key, the sponsor will then be granted viewing access (and possibly download access) to all media records related to the child they are sponsoring.

Figure 6:
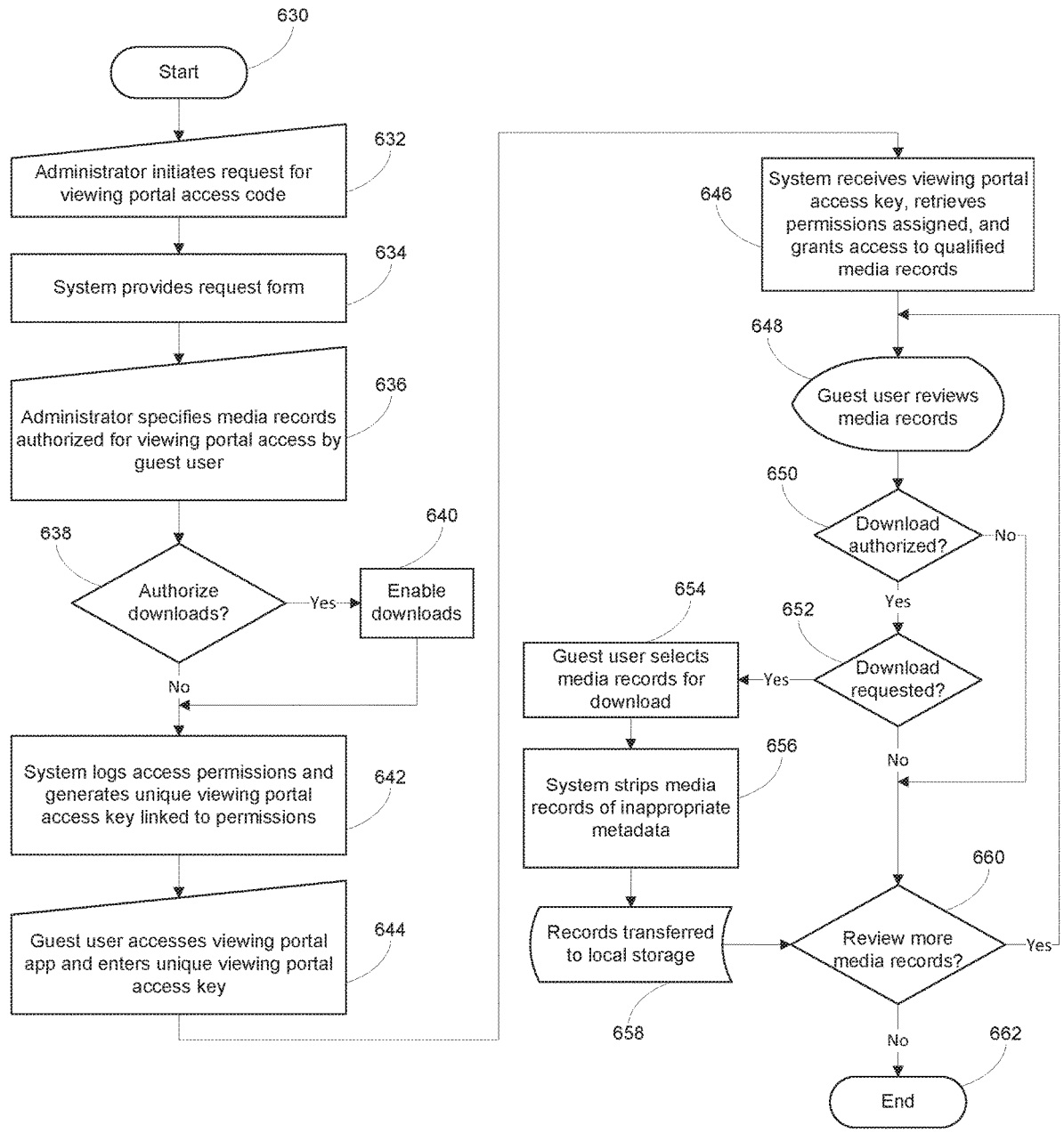
FIG. 6 is a flow diagram illustrating the process for providing controlled, limited viewing and download access to media records from a MMS using a viewing portal access key.

FIG. 6 is a flow diagram illustrating the process for providing controlled, limited viewing and download access to media records from a private MMS using a viewing portal access key. The process begins with block 630, where the process immediately proceeds to block 632. In block 632 the system administrator 134 initiates request for a viewing portal access key. In operation 634, MMS 111 returns a form to the system administrator for entering primary tag, media bucket, and/or subtag information for which guest user will be authorized to access 636.

In operation 638, system administrator 134 identifies if guest is granted download privileges. If download privileges are granted, an indicator is set to enable download privileges 640. MMS 111, logs access permissions and generates a unique viewing portal access key linked to viewing and download privileges 642.

In operation 644, guest user accesses a remote viewing app and enters the unique viewing portal access key. MMS 111 reads key to identify viewing portal access privileges, retrieves associated media records 646, and presents qualified media records to authorized guest user 648.

In operation 650, MMS 111 determines if download privileges are authorized for guest user. If download privileges are authorized and a request to download is received 652, guest user is asked to select media records to be downloaded 654. Prior to download, selected media records may be processed to extract any inappropriate metadata 656 and downloadable media records are then transferred to guest user's local storage 658.

If download privileges are not authorized or guest user chooses not to download media, process continues to block 660. Guest user is presented with option to review additional media records 648 or exit the viewing portal 662.

(PROXIMITY ASSIGNMENT) The MMS 111 can use a proximity search to facilitate quick access to nearby media records which typically are assigned spatial location metadata at acquisition such as, but not limited to, latitude and longitude coordinates which may also be augmented with dead-reckoning information. A proximity search can also be used to sort metadata tags which may or may not have pre-assigned spatial location information. When a new metadata tag is entered from a centralized location such as an office, spatial location metadata can be assigned during entry, typically using an address.

Figure 12A:
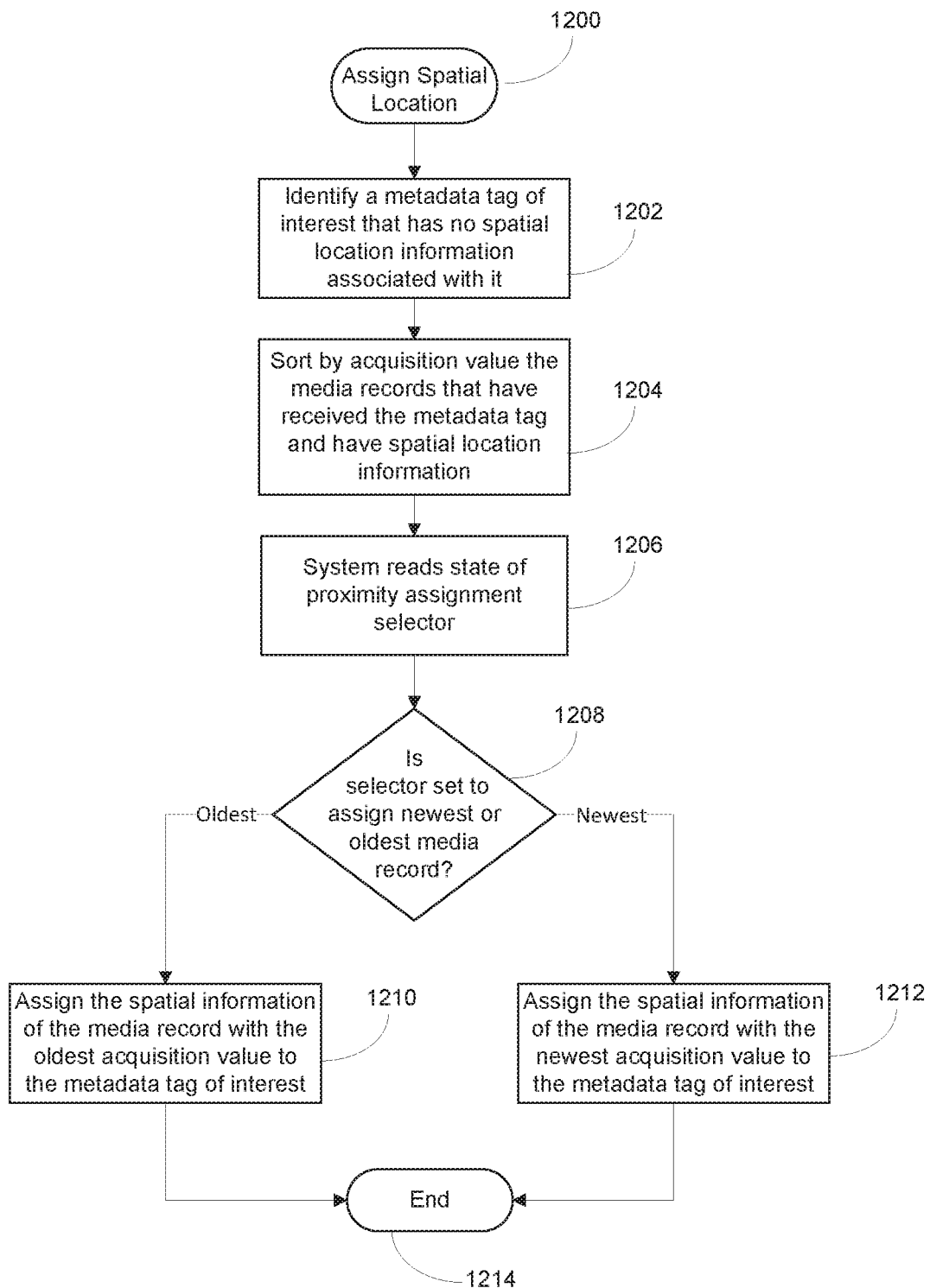
FIG. 12a is a flow diagram describing a static method for automatically assigning spatial location to metadata tags.

(Geo-spatial Location Assignment—Static) FIG. 12a is a flow diagram describing a static method for automatically assigning spatial location to a metadata tag by assessing the spatial location and acquisition time/date of media records to which the metadata tag has been assigned. The acquisition time/date of a media record is alternatively referred to as the acquisition value. If an address is not entered as part of the primary tag setup, spatial location metadata can be assigned 1200 by identifying the metadata tag 1202 and scanning all of the media records assigned to the metadata tag and sorting them by acquisition value 1204. The MMS 111 can then read the configuration of the proximity assignment selector 1206 to see if the system has been configured to assign the spatial location metadata of the media record with the newest or oldest acquisition value to the metadata tag 1208. If the selector was set to the newest acquisition value, the spatial location metadata of the media record with the metadata tag and the newest acquisition value is also assigned to the metadata tag 1212 and the process ends 1214. If the selector was set to the oldest acquisition value, the spatial location metadata of the media record with the metadata tag and the oldest acquisition value is also assigned to the metadata tag 1210 and the process ends 1214.

(Geo-spatial Location Assignment—Dynamic) When media for a specific metadata tag is acquired at multiple locations, MS 111 can dynamically assign a spatial location to the metadata tag by determining which of the media records with the metadata tag is closest to the user's current location and assign the spatial location of the media record to the metadata tag. This process allows a user to quickly access any metadata tags, such as but not limited to primary tags, that have relevance to their current location. This can inform a news photographer if they have acquired pictures for a specific primary tag near their current location or help a repairman quickly find the appropriate primary tag for the work they are about to perform at a location they are approaching.

Figure 12B:
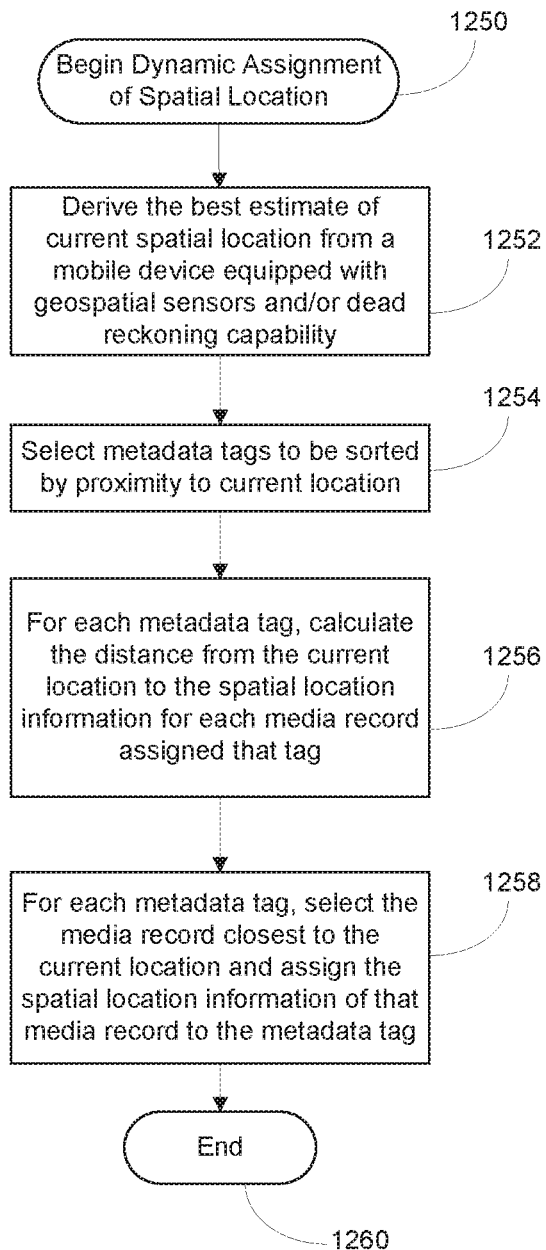
FIG. 12b is a flow diagram describing a dynamic method for automatically assigning spatial location to metadata tags.

FIG. 12b is a flow diagram describing a dynamic method for automatically assigning spatial location to metadata tags. The process begins with operation 1250 and proceeds to 1252 where the current spatial location of a media acquisition device 1252 is acquired and the metadata tag of interest selected 1254. The current spatial location metadata of the media acquisition device is then compared to the spatial location metadata assigned to all media records assigned the metadata tag and the distance between each media record and the media acquisition device is determined 1256. The spatial location metadata of the media record nearest the media acquisition device is then assigned to the metadata tag 1258. The process ends on 1260.

(INTERACTIVE TAGGED MEDIA DISPLAYS) The MMS 111 may present acquired media in several display modes in which media records are represented by identifiers such as, but not limited to thumbnails, icons, and the like, presented in display modes such as, but not limited to: media by-type, media matrix, media gallery, and the like.

Figure 7A:
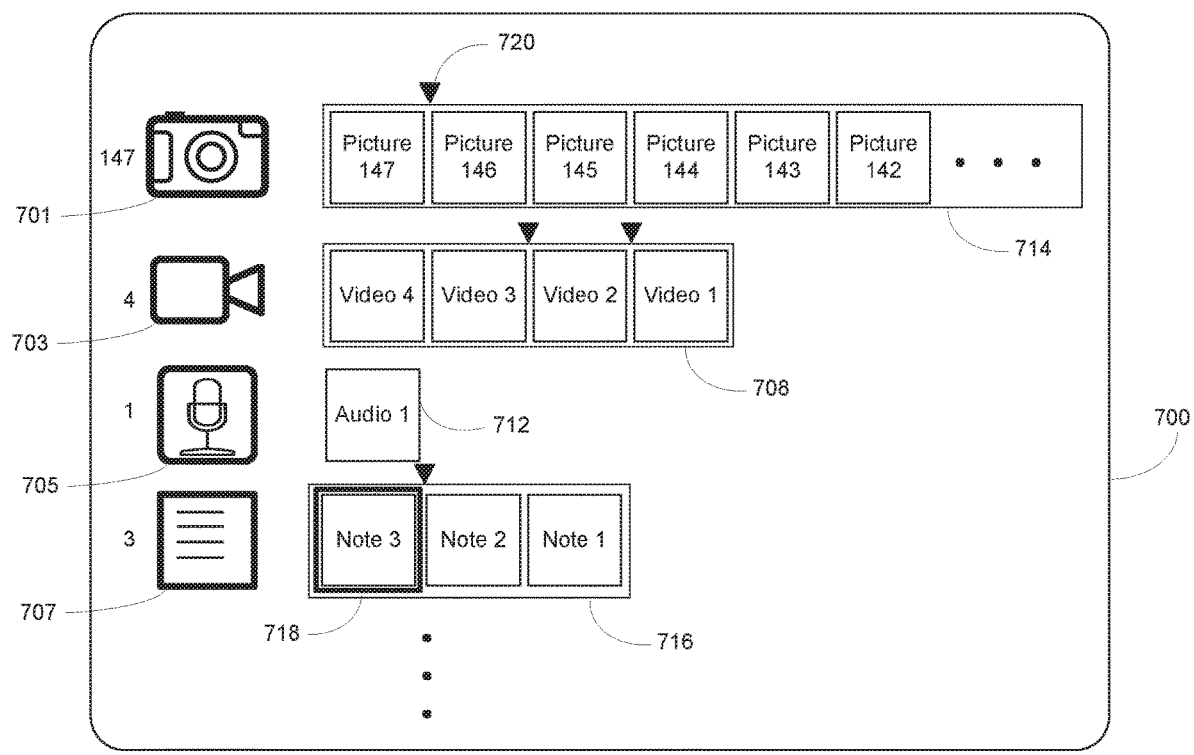
FIG. 7a is a user interface display illustrating a media by-type display mode comprising multiple mediastrips.

(BY-TYPE MODE) FIG. 7a is a user interface display 700 illustrating a media by-type display mode in which each media record identifier is organized into independent, scrollable mediastrips where each mediastrip represents a specific media type such as, but not limited to, photos, videos, audio recordings, notes, documents, and the like. Typically, the mediastrips are arranged in a parallel fashion where the identifiers for the most recent media records in the mediastrips are aligned. Within each mediastrip, media record identifiers are displayed in chronological order.

The by-type display mode quickly reveals media records for each media type even when there are only one or two instances of a specific media type among a large collection of media. This display format allows infrequent acquisitions of one media type to be quickly identified. For example, if the audio recording media record 712 was acquired after the three-thousandth picture, confirming the existence of the audio recording would be challenging in a conventional filmstrip or gallery presentation.

MMS 111 may represent each media type with an easily recognizable icon or symbol which can include an associated media count for each mediastrip. The example in FIG. 7a uses different camera icons to represent media types photos 701 and videos 703. The numeric value adjacent the icon indicates there are 147 photos in mediastrip 714 and 4 video recordings in mediastrip 708. A microphone icon 705 is used to represent audio recordings with an adjacent count value indicating a single media record 712, and a list icon 707 is used to represent a note with an adjacent count value indicating 3 media records 716. The numeric value can be especially useful when the number of media record identifiers exceeds the space on a given display as in mediastrip 714.

Typically, the newest media record identifier is positioned adjacent the media type icons 701, 703, 705, and 707 with remaining media record identifiers in associated mediastrips 714, 708, 712, and 716, respectively, positioned in chronological order based on assigned media record acquisition value. MMS 111 allows for the displayed mediastrips to be scrolled vertically and/or horizontally if the number of media types or media records exceeds the space available on the viewing screen.

In various viewing modes, MMS 111 may identify a media record as 'active' following some type of user interaction such as, but not limited to, touching or clicking on the media record identifier, or the like. The MMS 111 may visually differentiate the active media record identifier from other media record identifiers using a heavy outline, color distinction, highlight, or any other such indicator 718. The active media record remains differentiated in any display presenting the active media record indicator until the active media record is deselected.

(USER-DEFINED TIME GAP MARKERS) An indicator in the form of a symbol or marker 720, highlight, or the like, may appear in various display modes to represent significant gaps of time between the acquisition values, of acquired media records. The MMS 111 may display a time gap indicator 720 when the amount of time between the acquisition value associated with adjacent media record identifiers is equal to or greater than a specified period of time. For instance, the system default value may be set to display a time gap indicator when the time gap period between media records exceeds 30 days. The MMS 111 may also allow for a user to change the time gap period to a different increment such as a specified number of hours, days, months, years, or the like. Time gap indicators identify the time gaps considered material to the user that may not be readily apparent when viewing adjacent media record identifiers displayed in a mediastrip, gallery, or other presentation of multiple media records or media record identifiers.

Figure 7B:
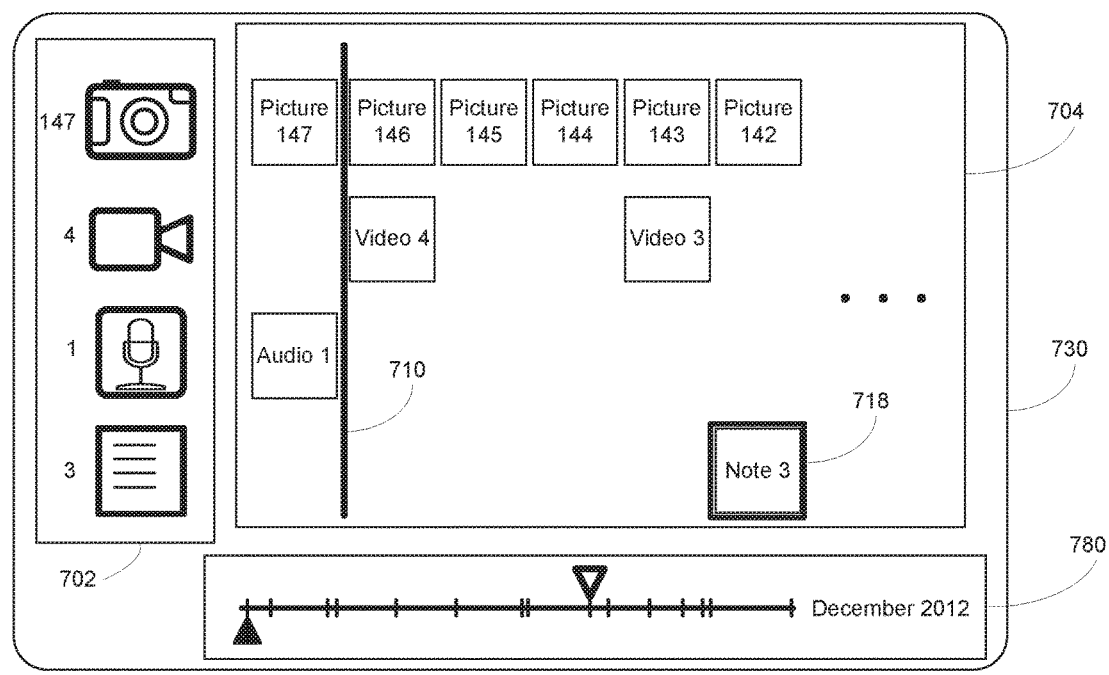
FIG. 7b is a user interface display illustrating a media matrix display mode in a horizontal presentation comprising four media types and a media timeline.

(MEDIA MATRIX MODE) FIG. 7b is an exemplary diagram 730 illustrating the same media record identifiers from FIG. 7a presented in a media matrix display mode. In media matrix display mode, MMS 111 spatially positions the media record identifiers for each media type in chronological order within its corresponding row but, except for the newest media record, it might also be placed in a column that has a media record identifier of another media type whose acquisition value is the same, within a defined time period, or the closest time period that precedes its own acquisition value. On one example, only one media record identifier of a given type is allowed in a column. The resulting matrix can be scrolled as a single entity.

In block 702, media type icons or symbols and associated media record counts are positioned at the beginning of each row for their respective media types. In block 704, MMS 111 displays media record identifiers in a media matrix format based on the acquisition value associated with the media record identifier, where rows represent media types and columns represent chronological time periods used to position media record identifiers across all media types.

The media matrix display mode provides a quick way to locate a media record of interest and easily see what media record of any type was acquired before or after it. For example, a property management company may take over 500 photos to document the condition of a property at the time a tenant moves in and out, but in a conventional filmstrip or gallery presentation it might be difficult to tell which photos applied to the 'move in' condition and which applied to the 'move out' condition.

Using MMS 111, a process is implemented where the property manager specifies the primary tag for a property and then acquires (enters) a note on an acquisition device that documents each move-in and move-out event. For instance, before starting to take pictures, a simple note could be typed with the words "Move in." Since the acquisition date and first few characters of the note could appear on the media record identifier for notes, the note of interest could be easily identified. Additional information could be included in the body of the note such as tenant name, number of tenants, pets, etc. A subsequent photo session with hundreds of pictures and some audio recordings, such as appliance sounds, then proceeds. Similarly, another series of notes, photos, and recordings taken months or years later when the tenant moves out, would include a note whose media record identifier would contain the words, "move out" and the acquisition date. In this example, the total number of photos acquired to document a property are significantly greater than the number of notes taken.

Referring to FIG. 7a, the property manager is thus easily able to identify the "move out" note of interest from the by-type display mode 700 by scrolling through the relatively small note mediastrip and touching or clicking on the media record identifier of the note of interest to make it the active media record 718. The property manager then selects the media matrix display mode 730.

In media matrix display mode, MMS 111, detecting an active media record, positions the displayed portion of the media matrix to show the media record identifiers of all media types acquired before, after and including the active media record.

Figure 7C:
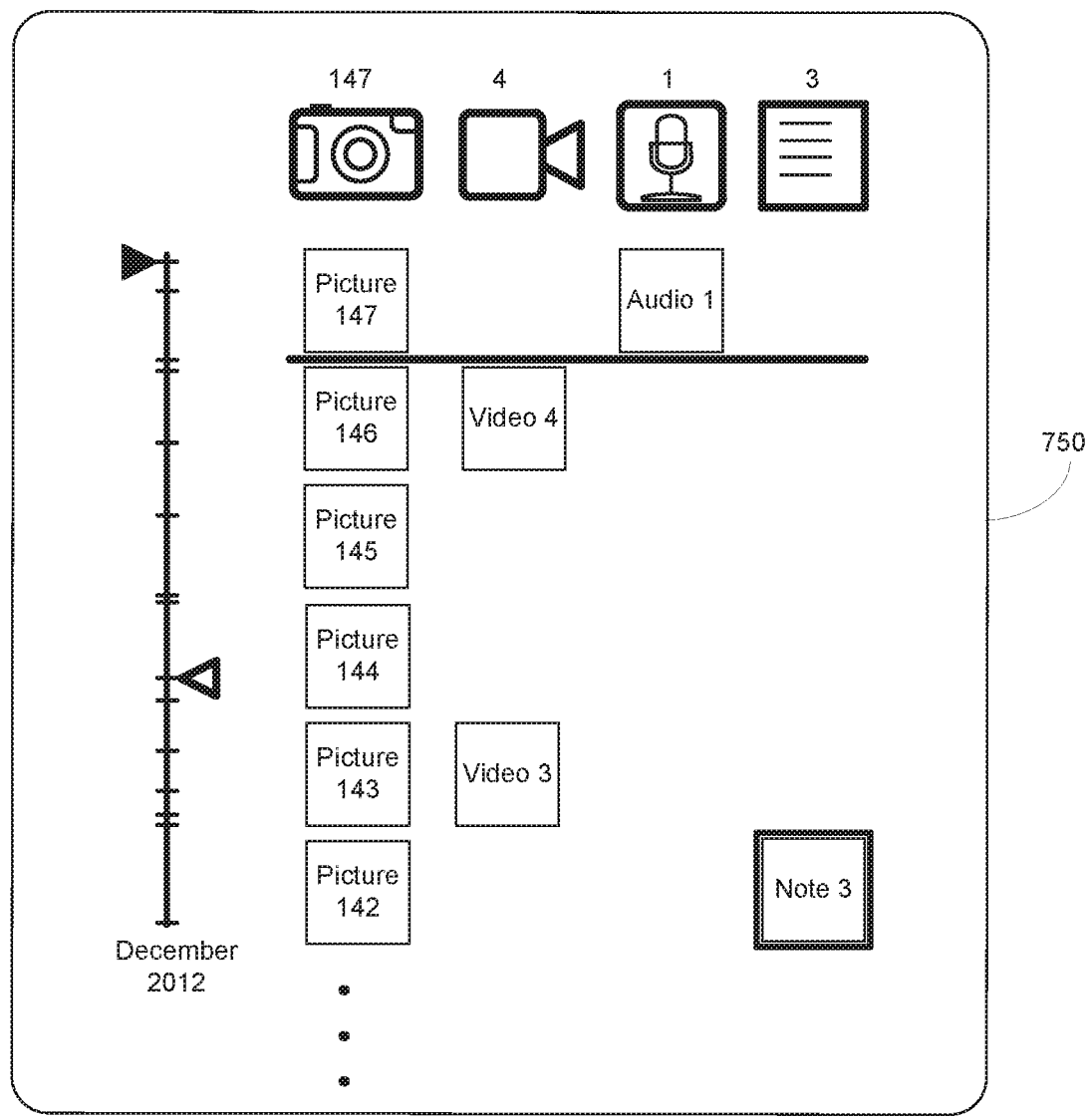
FIG. 7c is a user interface display illustrating a media matrix display mode in a vertical presentation.

Other embodiments of the media matrix display mode may not necessarily include a horizontal display format 730 as shown in FIG. 7b. For example, a vertical display format 750 is shown in FIG. 7c.

Figure 8A:
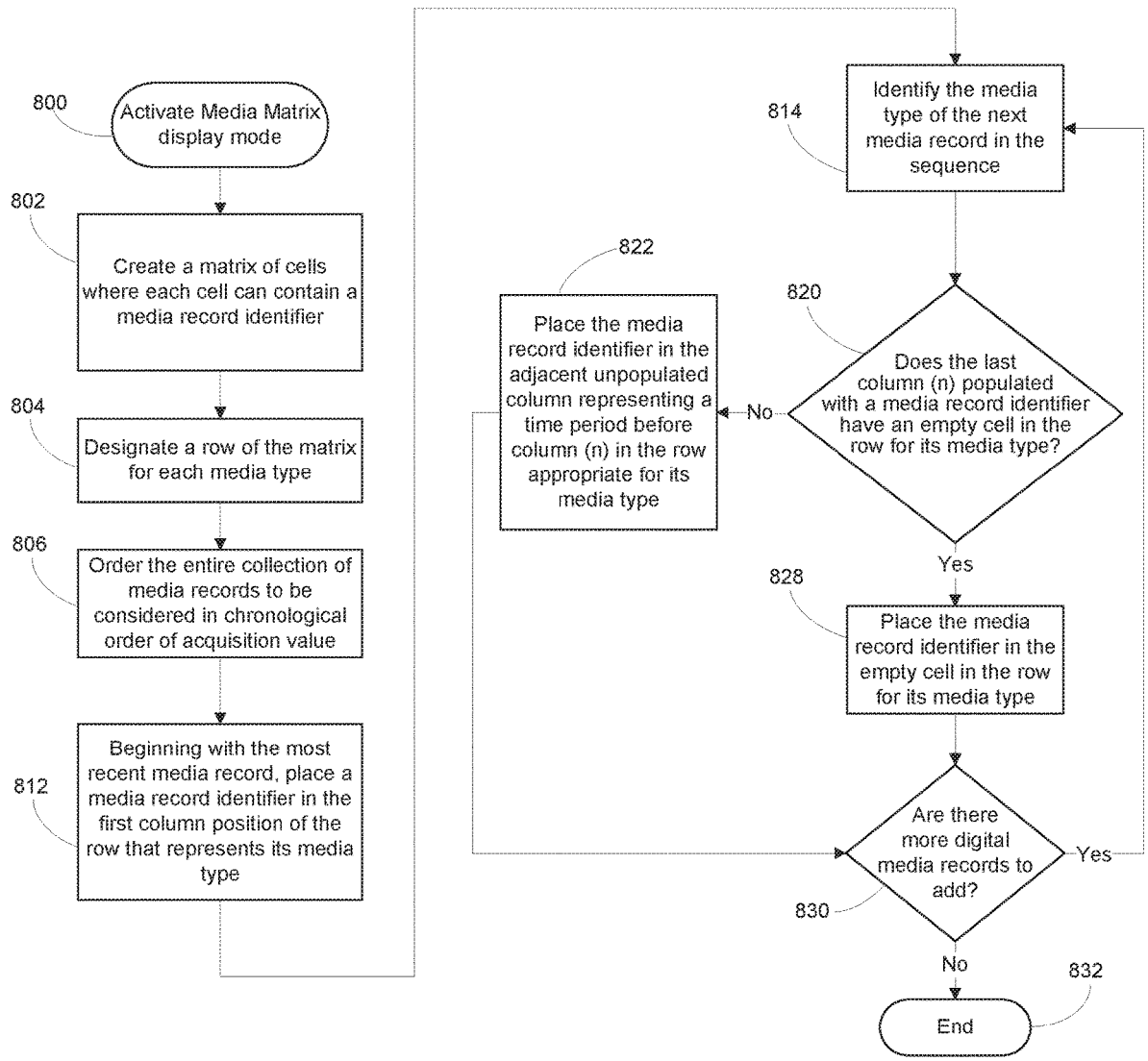
FIG. 8a is an exemplary flow diagram that represents a simple embodiment of a media matrix.

FIG. 8a is an exemplary flow diagram that represents an embodiment of a media matrix. For simplicity, FIG. 8a assumes a media matrix display is built sequentially starting with the newest media record and rebuilt for each addition of a new media record. In practice, building the media matrix could adopt many different approaches such as, but not limited to, starting at any point in the body of media records to be presented and building in any direction or building only portions of the media matrix currently being displayed using alternate flows and rules.

The process begins in block 800, when the media matrix display mode is activated. In block 802, MMS 111 allocates space for a matrix of cells for the purpose of displaying media record identifiers in interrelated time placement where rows of cells represent a specific media type to be displayed, such as photos, videos, audio recordings, etc., 804.

In operation 806, MMS 111 identifies relevant media records based on current parameters, such as but not limited to: selected primary tag, access permissions, and the like, and sorts the relevant media records in chronological order.

In operation 812, MMS 111 identifies the newest media record in the sorted collection and places a representation of the media record identifier in the first column position of the row designated for its media type.

In operation 814, MMS 111 determines the media type for the next media record in the sorted collection. The media matrix position for the next media record identifier is then determined 820 by identifying the cell in the media type row for that media record that lies in the column the last media record identifier was placed in. If the cell is empty, then the media record identifier is placed in the cell 828. If the cell is not empty, MMS 111 places the media record identifier in an adjacent unpopulated column representing an earlier time period and in the appropriate row for its associated media type 822.

In operation 830, MMS 111 checks for more media records in the sorted collection and, if there are more media records to add to the display, the process returns to operation 814 and repeats the steps for populating the media matrix display. If no additional media records are available to add to the media matrix display the process ends 832.

(TIME GAP BAR) While in media matrix mode a visual indicator may be used to convey a time period of user significance between the acquisition values of consecutive media records within a chronologically ordered media record collection of interest, herein referred to as a media time gap. The visual indicator is typically expressed as an indicator between columns such as, but not limited to, a vertical bar, color change or any other form of highlight. Moreover, the media record identifiers for the two media records defining the media time gap are positioned such that one is positioned in the column representing a time period preceding the time gap indicator and the other is positioned in the column representing a time period after the time gap indicator. For illustration, the time gap indicator will be expressed herein as a visual bar and referred to as the time gap bar.

A time gap value is a designated period of time based on a system default value or a user-defined value such as, but not limited to, a specified number of days, months, years, hours, or the like. Multiple time gap values can be applied to a media matrix using unique time gap indicators to indicate media time gaps that are equal to or greater than each time gap value.

In building a media matrix, a time gap value is compared to the media time gap to determine if a time gap bar should be displayed. In one example, as the media matrix is built, MMS 111 calculates the media time gap between all consecutive media acquisitions in a chronologically ordered media record collection of interest. Each media time gap is compared to the time gap value and if the media time gap is equal to or exceeds the time gap value, a time gap bar and the identifiers for the media records whose media time gap met or exceeded the time gap value are positioned in the media matrix such that the media record identifiers are in adjacent columns on opposite sides of the time gap bar.

Figure 8B:
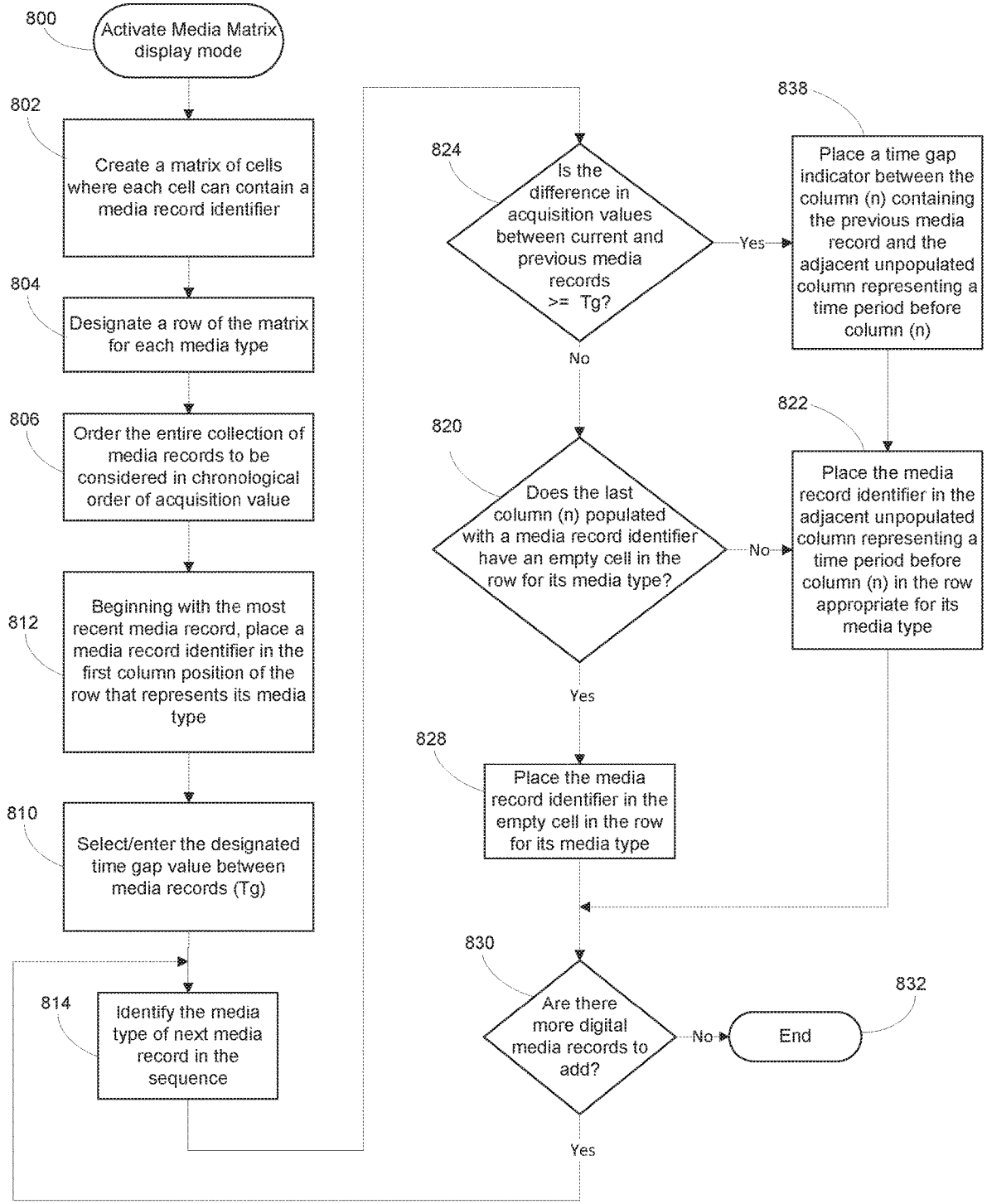
FIG. 8b is an exemplary flow diagram that represents an embodiment of a media matrix displaying a time gap bar.

FIG. 8b is an exemplary flow diagram that represents an embodiment of a media matrix displaying a time gap bar. The method includes all the steps outlined in FIG. 8a and incorporates additional steps pertaining to placement of a time gap bar assuming a default or user-entered time gap period has been established. As a result of the additional steps, the position of media record identifiers adjacent to the time gap bar may change.

To determine if a time gap bar 710 should be displayed, the MMS 111 identifies the designated time gap value (Tg) 810, and compares the time difference between the acquisition values of adjacent media records in a chronologically ordered media record collection of interest 824. If the time difference meets or exceeds the designated time gap value (Tg), a time gap bar 710 is placed between the column (n) containing the previous media record identifier and the adjacent unpopulated column representing a time period older than column (n) 838. The media record identifier is then placed in the unpopulated column and the row corresponding to the media record's type 822.

If the time difference between the acquisition values of adjacent media records in a chronologically ordered media record collection of interest is less than the designated time gap value (Tg), the process continues from operation 824 to 820 to determine if the column (n) containing the previous media record identifier has an empty cell for the current media record's type. If the cell is not occupied the process continues to operation 828 and the media record identifier is placed in the empty cell for row with the corresponding media type.

If the cell is occupied, the process continues to operation 822 and the media record identifier is placed in the adjacent column with the empty cell for the corresponding media type. In operation 830, MMS 111 checks for more media records in the sorted collection and, if there are more media records to add to the display, the process returns to operation 814 and repeats the steps for populating the media matrix display. If no additional media records are available to add to the media matrix display the process ends 832.

Figure 9A:
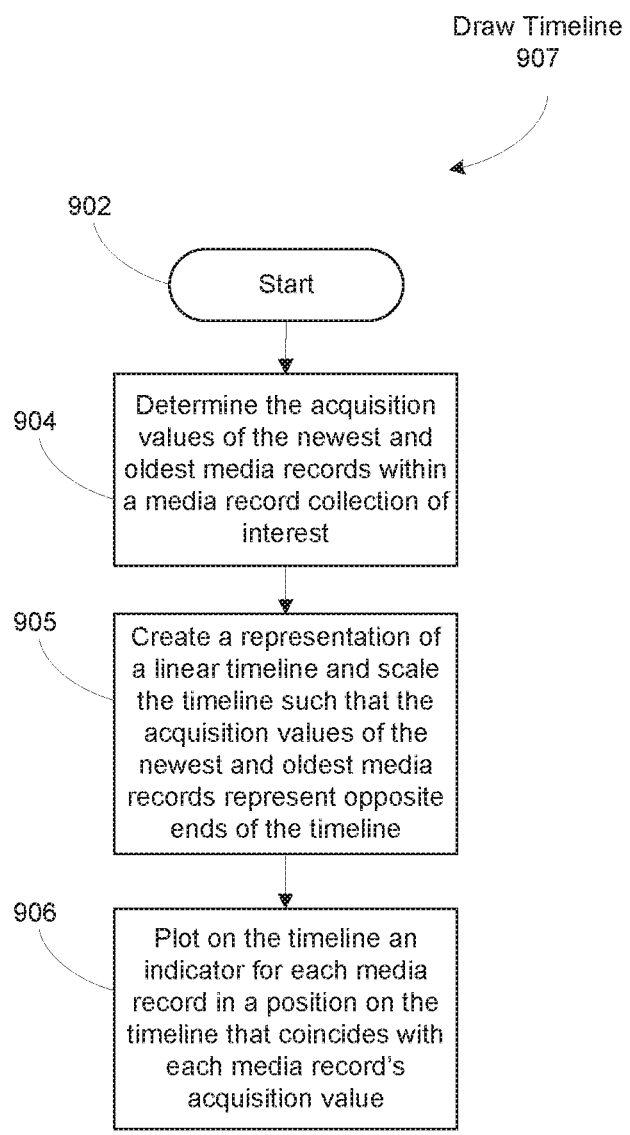
FIG. 9a is a flow diagram describing a process for generating a linear timeline to be added to various display modes.
Figure 9B:
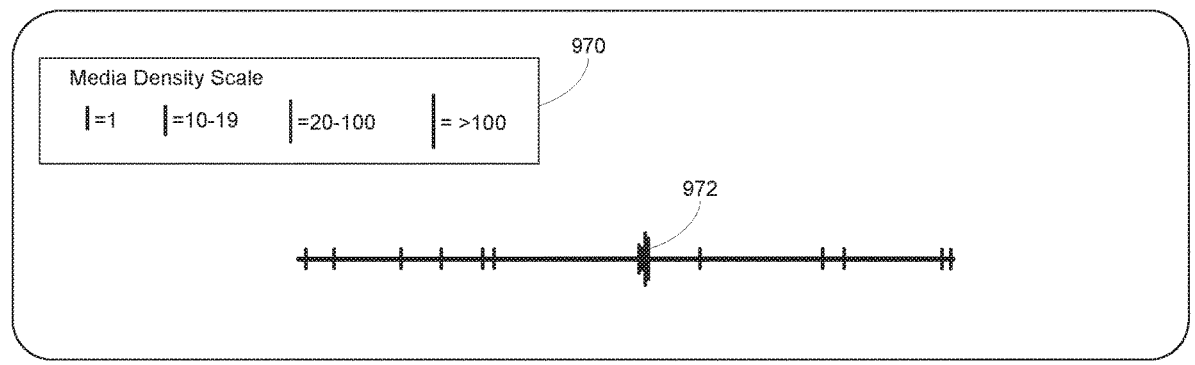
FIG. 9b is an exemplary illustration of a media timeline with a timeline density function.
Figure 9C:
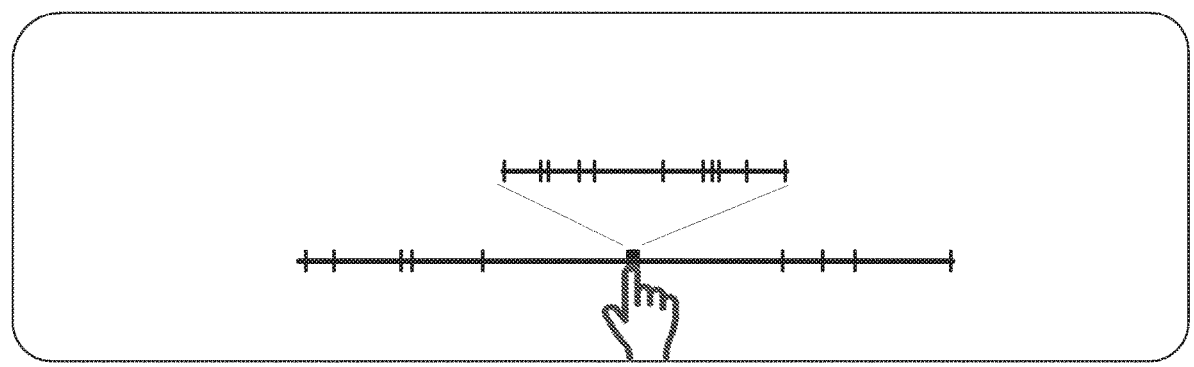
FIG. 9c is an exemplary illustration of a media timeline with a magnifier function.
Figure 9D:
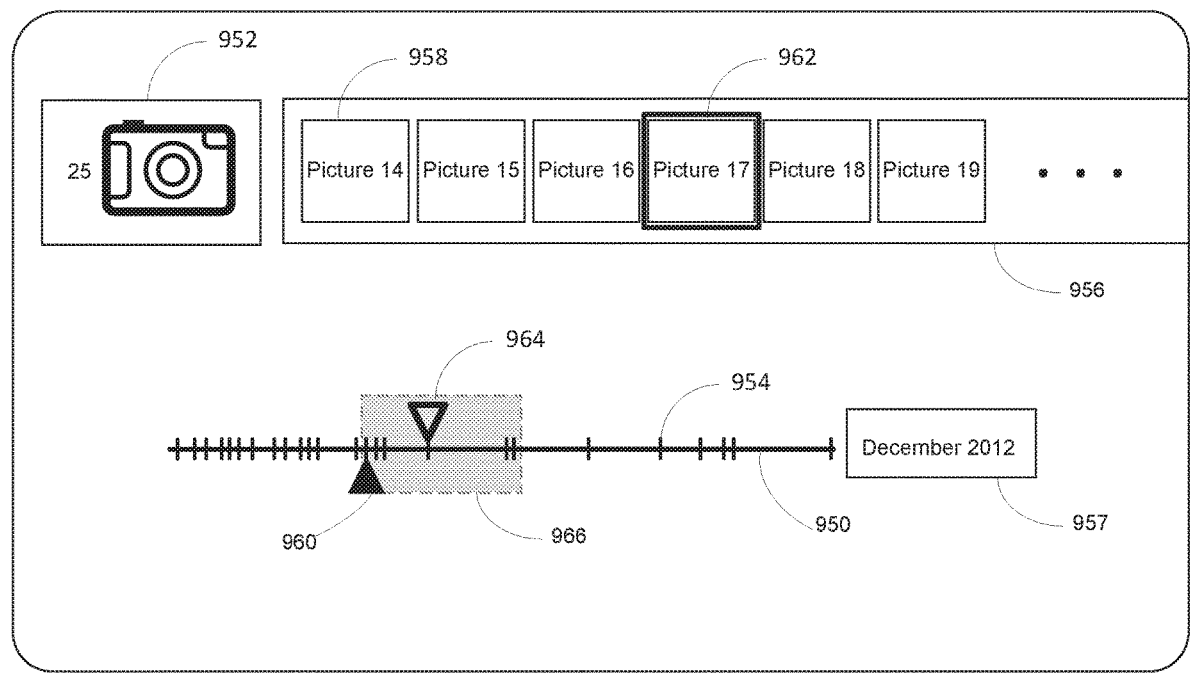
FIG. 9d is an exemplary illustration of the interactive relationship between timeline informational markers and displayed media
Figure 9D:
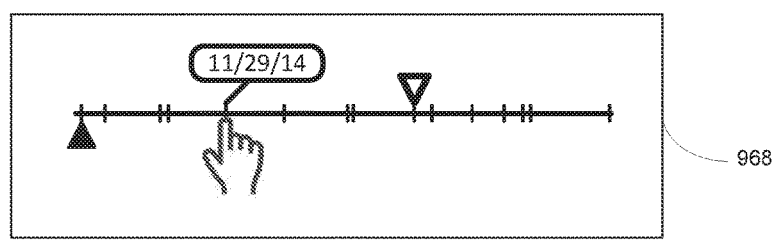
Figure 9E:
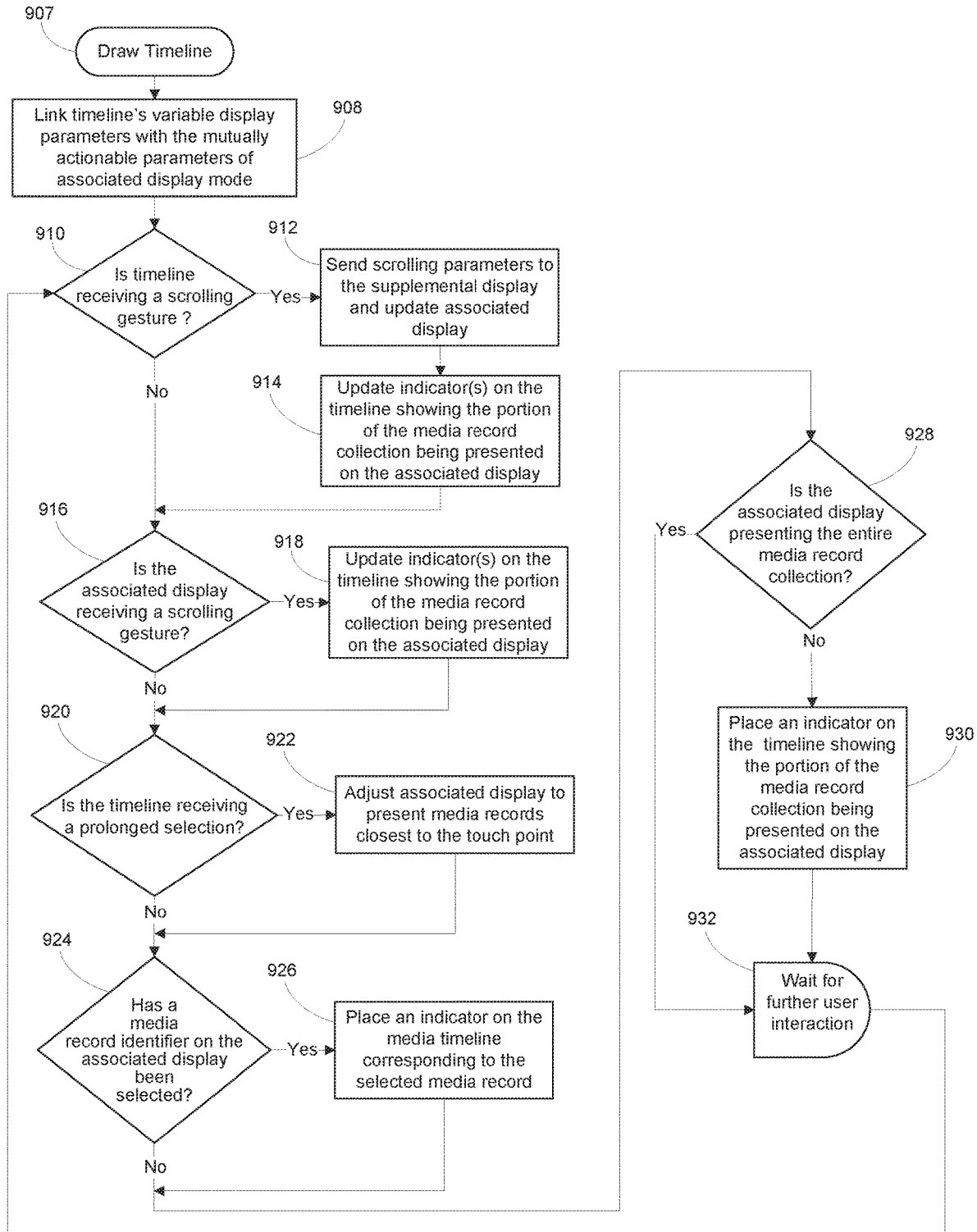
FIG. 9e is a flow diagram describing the process for creating an interactive link between a media timeline display of a media record collection and other display formats associated with the same media record collection.
Figure 9F:
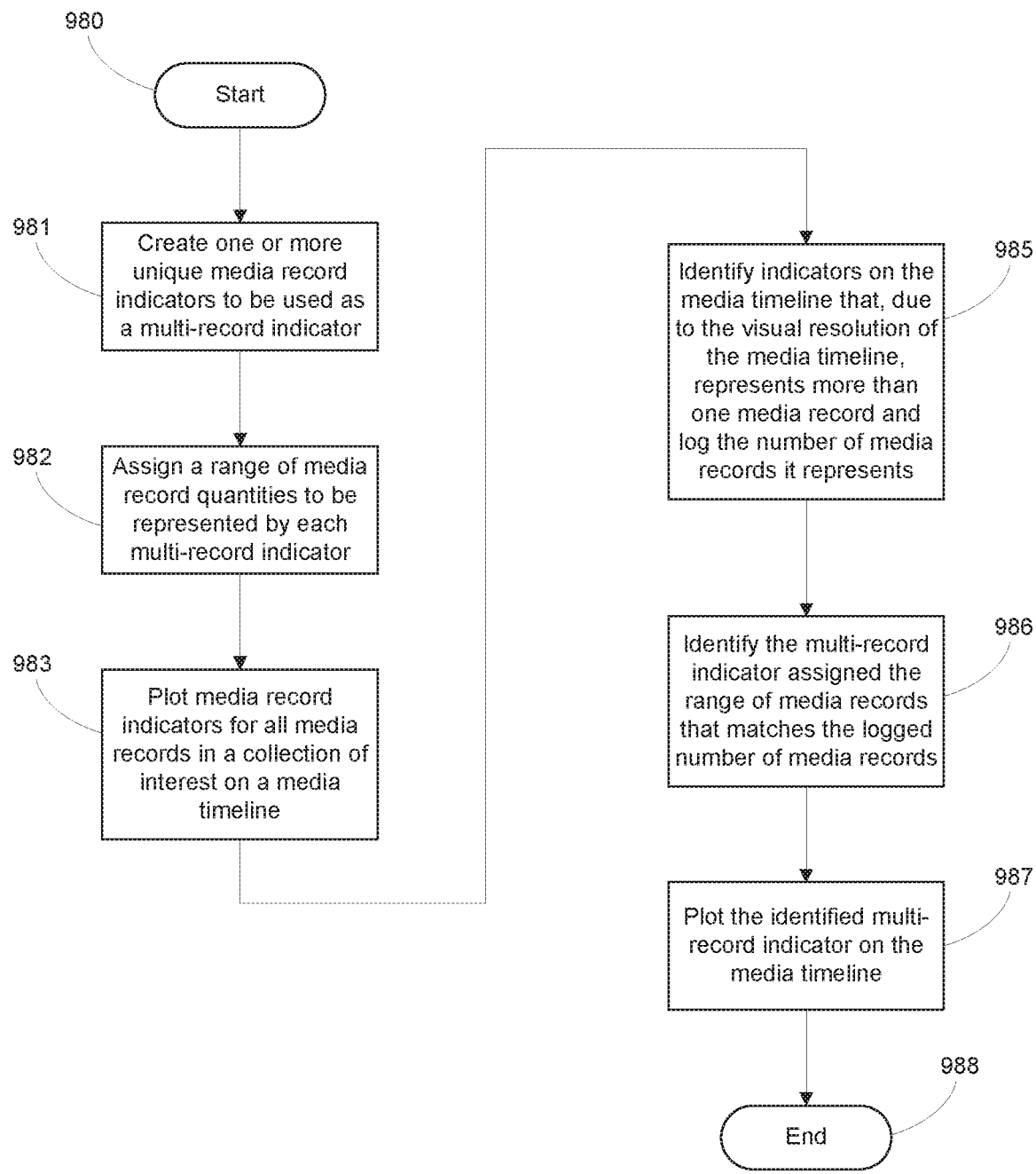
FIG. 9f is a flowchart representing an embodiment of a timeline density function.
Figure 9G:
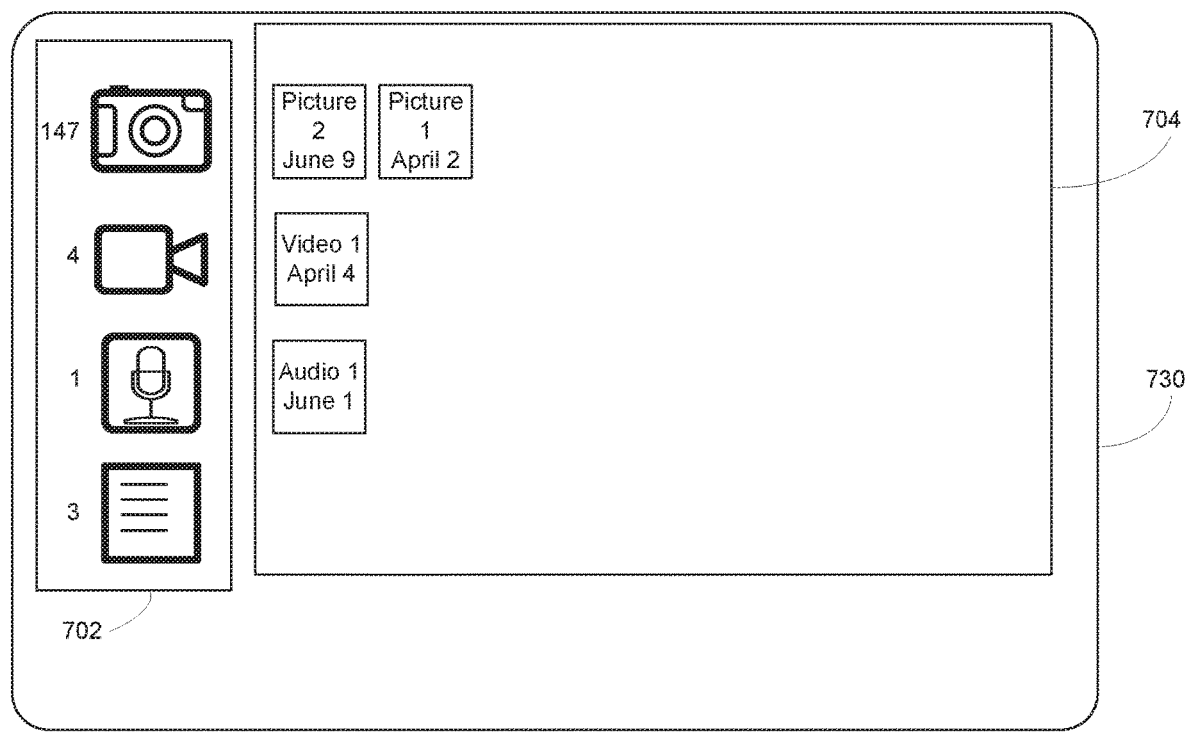
Figure 9H:
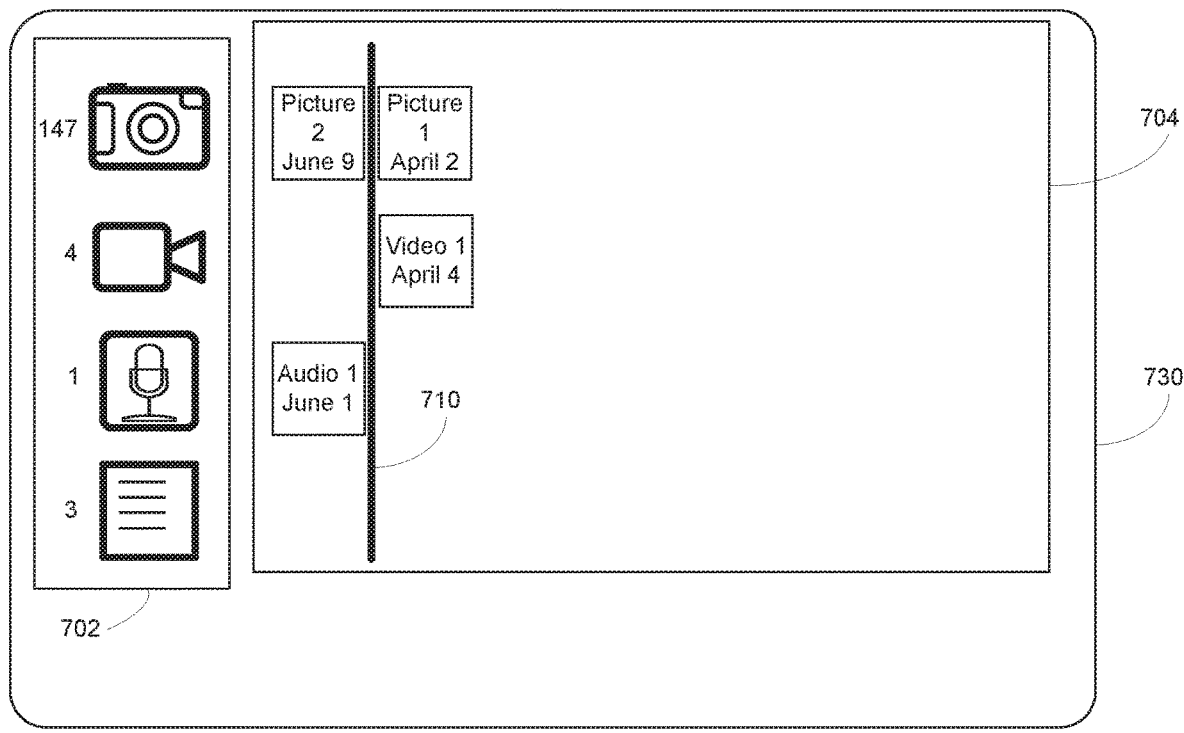
FIG. 9h illustrates a media matrix with a time gap bar displaying the same four media records as in FIG. 9g, generated using the exemplary flow diagram in FIG. 8b.

An example of how adding a time gap bar to a media matrix can impact placement of media record identifiers is shown in the comparison between FIG. 9g and FIG. 9h. FIG. 9g shows a media matrix for four media records without an active time gap bar function, generated with the exemplary flow diagram in FIG. 8a. FIG. 9h shows a media matrix with an active time gap bar function for the same four media records using the exemplary flow diagram in FIG. 8b. FIGS. 9g and 9h are both compliant with one attribute of a media matrix, that all the media record identifiers in a column are associated with acquisition values before or after the acquisition values of media record identifiers in adjacent columns.

For example, in FIG. 9g, picture 2, video 1, and audio 1 were all acquired and have acquisition values later (more recently acquired) than the acquisition values assigned to picture 1. Being the identifier for the newest media record, Picture 2 was the first media record identifier placed in the column. Video 1 and Audio were both older than Picture 2 and there was an open cell in the Picture 2 column in their respective media type rows so they were placed in the same column. Picture 1 could not be placed in the same column as Picture 2 because Picture 2 already occupied the only cell for the picture row in that column. Instead, Picture 1 was placed in an adjacent column representing an earlier (older) period of time compared the column containing Picture 2 where Picture 1 became the indicator for the newest media record in that column FIG. 9h is also compliant with a media matrix attribute that all the media record identifiers in a column are associated with acquisition values before or after the acquisition values of media record identifiers in adjacent columns, but the media record identifier Video 1 has changed columns to allow the media time gap larger than the time gap value to exist between columns rather than within a column. The time gap bar can then accurately indicate that a media time gap exists between the chronologically sequential acquisition values of the media records represented in the adjacent columns that is larger than the time gap value. For example, the difference between the two closest acquisition values in the two adjacent columns is larger than the time gap value.

Referring to diagram 730 in FIG. 9h, an example of the process for including a time gap bar in a media matrix could be described as follows: the chronological order of the newest media records is Picture 2, Audio 1, Video 1 and Picture 1; the time gap value is 30 days; and time difference between the acquisition values of Audio 1 and Video 1 is 58 days. When MMS 111 positions Video 1 in the media matrix 704, even though there is an empty cell in the last column populated below Picture 2, the time gap test between sequential media records exceeds 30 days causing Video 1 to be placed in the older, adjacent column and a time gap bar placed between the columns displaying Audio 1 and Video 1. Thus, the indicator 710 conveys Picture 2 and Video 1 were acquired 30 days or more prior to the acquisition of Picture 2 and Audio 1.

Each time new media is acquired while media matrix mode is the active display state, display is updated/refreshed post-acquisition using methods described in FIG. 8a or 8b based on respective embodiment in use.

(MEDIA TIMELINE) In some viewing modes, the MMS may display a media timeline representing the linear period of time between the acquisition value of the oldest media record within a media record collection of interest to either the acquisition value of the newest media record within a media record collection of interest or the current time/date. Indicators placed on the media timeline show where on the media timeline the acquisition value of each media record in the collection is located.

FIG. 9a is a flow diagram describing a process for generating a linear media timeline 780 based on the newest and oldest acquisition values in the media collection of interest which can be added to various display modes as previously illustrated in FIG. 7b, where it provides a complementary representation of the media record collection presented in the media matrix 704. In operation 902, the media timeline is activated in conjunction with activation of an associated display mode, proceeding to operation 904 in which acquisition values of the newest and oldest media records are identified within the media record collection of interest.

In operation 905, MMS 111 creates a representative timeline scaled such that the indicators of the acquisition value for the newest and oldest media records are placed at opposite ends of the media timeline. Remaining instances of media records are plotted as indicators on the media timeline in the position that coincides with each media record's acquisition value 906. Actions outlined in operations 904, 905, and 906, will herein be referred to collectively as "draw timeline" 907.

(MEDIA TIMELINE DENSITY FUNCTION) When the many media records are collected in a short time period, their media record indicators become crowded together as the visual resolution of media timeline becomes lower over time. As a result, the indicators for a group of media records can eventually become crowded together and even indistinguishable and may appear as a single indicator. The timeline density function addresses this challenge by modifying the appearance of an indicator in one or more ways when a single indicator no longer visually represents a single media record in the displayed timeline. When an indicator no longer visually distinguishes a single media record, the indicator is modified in a manner that allows the indicator to be understood as representing more than one media record. Such modified indicators are herein referred to as multi-record indicators. Moreover, a multi-record indicator can be further modified in distinct ways to allow each modification to represent a range of media record quantities represented by the multi-record indicator. Typically, the range of media record quantities assigned to each multi-record indicator should allow all possible media record quantities to be represented by a multi-record indicator to be addressed. Possible indicator modifications include, but are not limited to, indicators of various thickness, indicators of various colors, and indicators of various lengths.

FIG. 9b is an exemplary illustration of a media timeline with a timeline density function. In FIG. 9b, a media density scale 970 illustrates how the multi-record indicators are modified by length when an indicator represents more than one media record and the range of media record quantities associated with each indicator length. The cluster of indicators toward the center of the timeline 972 indicates that three of the four indicators clustered together are multi-record indicators representing more than one media record per the media density scale 970. All the other indicators on the media timeline represent the acquisition value of one media record.

FIG. 9f is a flowchart representing an embodiment of a timeline density function. Starting with operation 980 and moving directly to operation 981, the media record indicator used with a media timeline is modified to provide distinct variations that can be distinguished from each other when plotted on the same media timeline—each modification being referred to as a multi-record indicator. Each multi-record indicator is then assigned a range of media record quantities it is to represent 982. The media record collection of interest is then plotted on a media timeline 983 and any media record indicators that visually represent more than one media record are identified and the number of media records represented by each indicator is logged 985. The indicators representing more than one media record are then mapped to the multi-record indicator that includes in its media record quantity range the number of media records represented 986. Each indicator representing more than one media record is then replaced on the media timeline by the appropriate multi-record indicator 987 and the process completes 988.

When a single indicator on the timeline represents more than one media record, the appearance of the indicator could be further modified to indicate what combination of media types are represented by the indicator. For example, the indicator length could correlate with a multi-record indicator while the color could correlate with unique combinations of media types.

(MEDIA TIMELINE MAGNIFIER FUNCTION) FIG. 9c is an exemplary illustration of a media timeline with a magnifier function. The magnifier function provides an enlarged portion of the media timeline that allows either a selected cluster of individual media record indicators or a selected multi-record indicator to be viewed in an expanded display that visually provides increased time resolution allowing individual media record indicators to be more easily discerned or multi-record indicators to be expanded out into individual or lower density multi-record indicators. The magnifier function is made active by a user action such as, but not limited to a mouse-click or touch/hold gesture at a point on the media timeline. MMS 111 responds to the gesture by identifying the individual media records or multi-record indicator(s) near the point of contact and producing a pop-up display that represents an increased time resolution display of the associated media as illustrated in FIG. 9c. Alternatively, a pinch or expand gesture on the media timeline could be used to expand or contract the time resolution of the media timeline respectively.

(MEDIA TIMELINE INTERACTIVE LINK WITH DISPLAYED MEDIA) MMS 111 creates an interactive link between the media timeline and other display formats such as, but not limited to, a media by-type display mode, media matrix display mode, gallery display mode, and the like. Interactive link causes a coordinated system response among various display modes to user interactions that may include gestures such as, but not limited to, scrolling the media display, touching, mouse-clicking, or mouse hovering on/over a media record, touching, mouse-clicking, mouse-hovering on/over the media timeline, or the like.

FIG. 9d is an exemplary illustration of the interactive relationship between media timeline informational markers and displayed media records that may be applicable across various display modes. In this example, media timeline 950 is correlated to the photo media type 952. Tick marks 954 positioned on media timeline 950 are representative of all acquired photos in mediastrip 956 relating to the active primary tag. MMS 111 may display an informational pop-up 957 showing the date of first acquisition in response to user interaction such as, but not limited to, a touch, mouse-click or mouse-hovering on/over the end of the timeline nearest the oldest media record.

(MEDIA TIMELINE INFORMATIONAL MARKERS) MMS 111 may use a marker to correlate the newest media record in the display 958 with its relative location on the media timeline 960. If a media record has been made active 962 from user interaction, a differentiated marker 964 may be used to indicate the relative location of the active media record on the media timeline. An indicator such as, but not limited to, a shaded area may be imposed on the media timeline 966 to represent the span of media records currently showing in the associated display. Markers 960, 964 and shading 966 are updated and repositioned based on user interaction such as scrolling, touching or mouse-clicking on the associated display.

MMS 111 may also display an informational pop-up showing date stamp of associated media in response to user interaction such as, but not limited to, a touch or mouse-click 968 on the timeline media record indicator. Date associated with timeline media record indicators may represent the date of acquisition, date of last modification, or the like.

The MMS may provide a search function which enables the user to refine criteria for viewing media based on selected time and/or date parameters. When the search is active, the media timeline is overlaid with an indicator such as, but not limited to, shading to give a visual indication of where the media returned from the search query resides on the media timeline.

FIG. 9e is a flow diagram describing the process for creating an interactive link between a media timeline display of a media record collection and other display formats associated with the same media record collection.

Process begins in block 907 where media timeline is drawn. In operation 908. MMS 111 creates a link allowing direct correlation between media timeline display parameters and mutually actionable parameters of the associated display.

In operation 910, MMS 111 determines if user interaction is the result of a media timeline scrolling gesture. If so, MMS 111 sends the scrolling parameters defining the interaction to associated media display and updates associated display in a correlated response to the media timeline scrolling gesture 912. Media timeline indicators are updated accordingly if the scrolling gesture changes the positioning of the media records in the associated display.

For example, if a scrolling gesture is applied to media timeline, the displayed media may move in conjunction with the scrolling action. Displayed media records continue to refresh until the scrolling action stops. As the associated display is updated, correlated media timeline indicators such as the newest media indicator and the media timeline shading is updated to reflect media records showing in the display 914. Example media timeline indicators are illustrated in FIG. 9d.

In operation 916, MMS 111 determines if user interaction is a result of a scrolling gesture applied to an associated media record display. If so, correlated media timeline indicators such as the newest media indicator and media timeline shading may be updated to reflect media records showing in the associated display 918.

In operation 920, MMS 111 determines if user interaction is a prolonged selection of a media record or area on media timeline. If so, associated display may adjust to present media records acquired closest to the relative time nearest the selection point 922.

If a displayed media record is selected/made active 924 on an alternate display by a user interaction such as, but not limited to, a touch or mouse-click, MMS 111 highlights the selection and updates the active media record indicator to reflect the corresponding location of the media record acquisition value on the media timeline 926. Example illustrations of an active media record 962 and its corresponding media timeline indicator 964 are presented in FIG. 9d.

In operation 928, MMS 111 determines if the media records shown in the display represent the entire collection of interest. If not, an indicator such as, but not limited to shading, may be overlaid onto the media timeline 930 to reflect the media record collection of interest presented in the associated display. An example of media timeline shading 966 is illustrated in FIG. 9d.

In operation 932, MMS 111 waits for further interaction. Each subsequent interaction will repeat the process starting at operation 910 in which display and/or media timeline are updated accordingly.

(PERSONAL MEDIA FILTER) MMS 111, can facilitate the ability to quickly change between a presentation of media records acquired by all contributors, and a filtered presentation of media acquired by only a single contributor. A method for changing between media presentations can include, but is not limited to, a one-touch or one-click interaction or gesture using a display status indicator such as, but not limited to, an on/off switch, button or the like.

For example, on various displays, MMS 111 may include a display setting in the form of a personal filter selector, where a sliding or touching action on the switch can change the setting and the associated displayed media. A personal filter selector in the "on" or active position would instruct MMS 111 to display only the media acquired by the specified contributor, typically the active user. Likewise, a personal filter selector in the "off" position would instruct the system to display media acquired by all contributors within the scope of selected system parameters, such as a specific primary tag. Typically, a specified contributor is identified via a user authentication process, such as but not limited to, login name, password, and/or the like.

Figure 10:
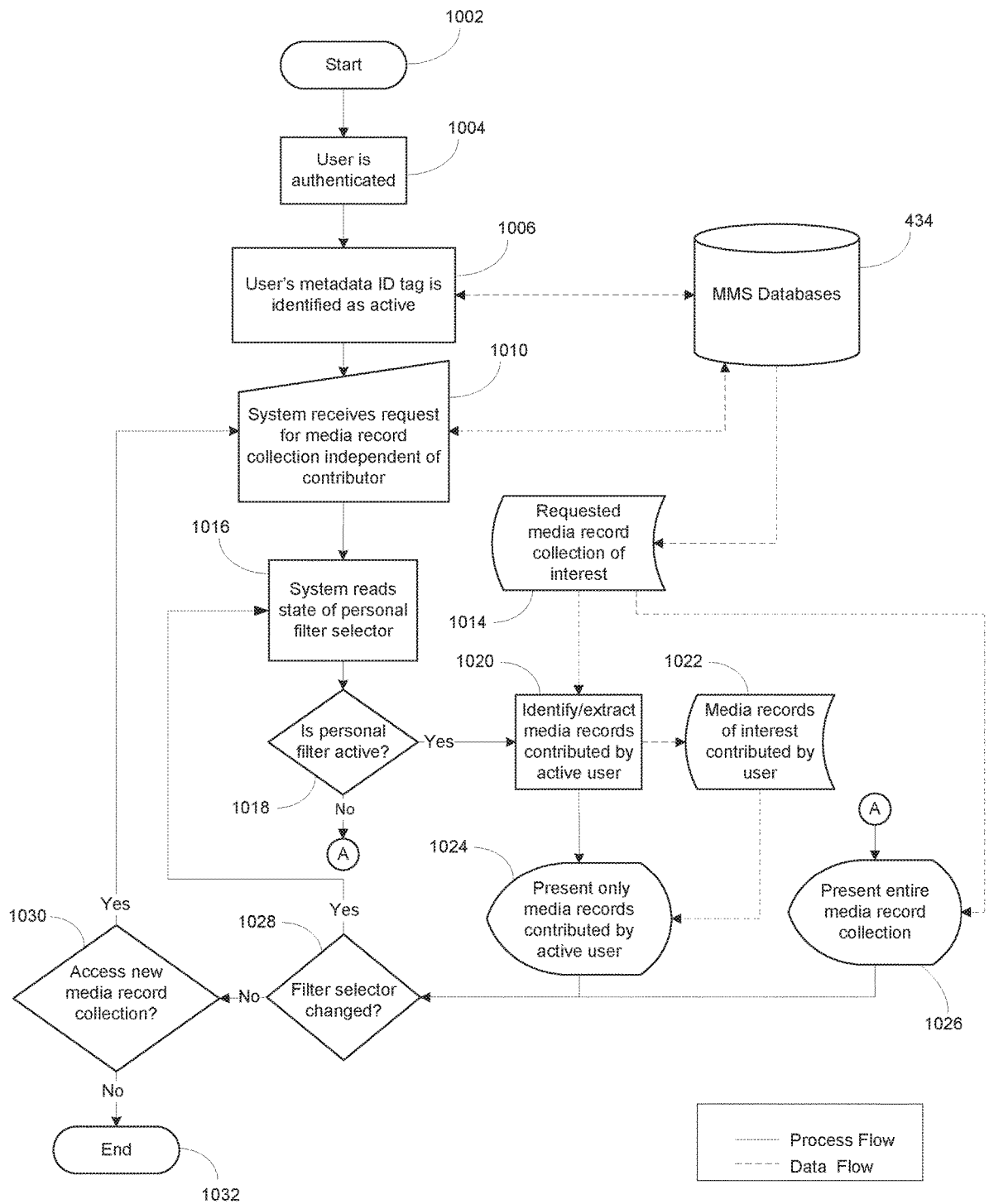
FIG. 10 is a flow diagram describing a process for quickly changing between accessing an entire media collection and accessing only the media records in the media collection contributed by the current user.

FIG. 10 is a flow diagram describing a process for quickly changing between accessing an entire media collection and accessing only the media records in the media collection contributed by the current user.

The process begins with block 1002, where the process immediately proceeds to block 1004. In block 1004 user is identified via a login process including, but not limited to, entering a user ID, password, fingerprint scan, or the like, or any combination thereof.

In operation 1006, MMS databases 434 is accessed to identify the metadata ID tag assigned to the user's media record acquisitions. In operation 1010, MMS 111 receives request from user to retrieve a media collection for an entered or selected primary tag and/or subtag. MMS 111, accesses MMS databases 434 and returns requested media collection 1014.

Prior to displaying media, MMS reads the state of the personal filter selector 1016 to determine if selector is active 1018. If so, system identifies and extracts media that was contributed by the active user 1020 from total media collection 1014 and stores extracted media in a temporary location 1022. Extracted media is then presented/displayed 1024.

If the personal filter is not active, the entire media collection 1014 is presented/displayed 1026. MMS 111 updates the display based on further interaction such as a change in the filter selector 1028 or a change to the media collection being displayed 1030. If there is no further interaction to the displayed content the process ends 1032.

(TAG CHANGE MARKERS) When media is presented in a listing where individual media records have different primary tags, the MMS may display indicators that signal a change when consecutive media are sourced from different primary tags. For example, when retrieving media by time order, the MMS provides a listing of media records in ascending or descending order irrespective of the primary tag name. Tag change markers allow the user to easily identify when the primary tag assigned to the media record changes while viewing and/or scrolling through the listing.

(ECHO MODE) A process herein referred to as echo mode, may be used to provide automatic key-based exporting and importing of media records between two or more multimedia management systems.

Figure 11A:
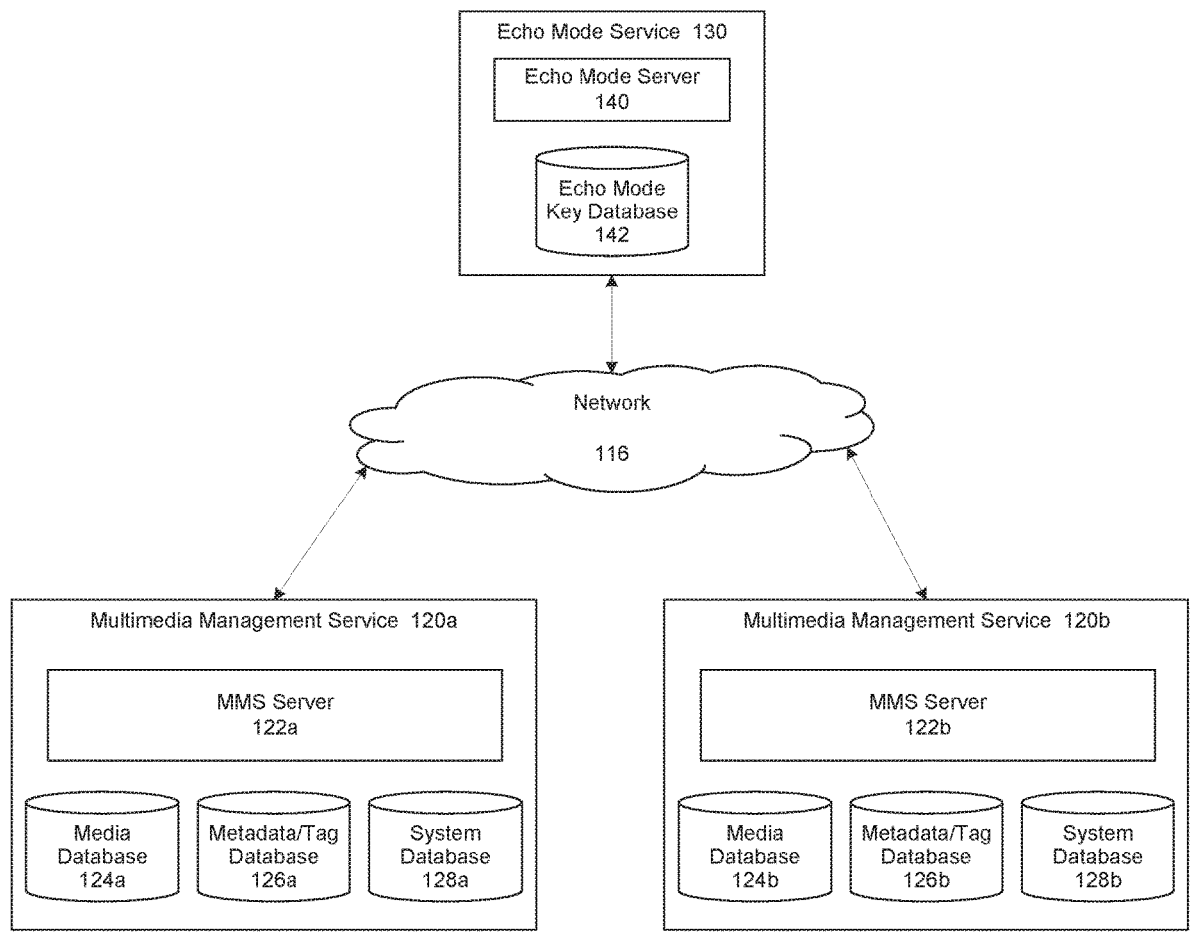
FIG. 11a is an exemplary diagram illustrating interaction of multimedia management systems using echo mode.

FIG. 11a is an exemplary diagram illustrating interaction of multimedia management systems using echo mode. Typically, echo mode is facilitated through the use of an echo mode service 130, comprising echo mode server 140, and echo mode key database 142, communicating to two or more multimedia management systems via a network 116. Since the echo mode service may have access to information about the exporting and importing MMS systems, it may be preferred to have a trusted and impartial $3^{rd}$ party provide the service. Providing a $3^{rd}$ party echo mode service can be implemented by using an independent echo mode service interfaced to either independent MMS systems using a locally-hosted multimedia management service or MMS systems using cloud-based multimedia management service. Alternatively, if both the exporting and importing MMS systems are using a common cloud-based multimedia management service provided by a $3^{rd}$ party, the echo mode service can be integrated into the cloud-based multimedia management service.

Echo mode allows one MMS 111, herein referred to as Contributor, to acquire and transfer media records to a requesting MMS 111, herein referred to as Requestor. The transfer uses a key-based access code, herein referred to as an echo mode access key provided through the Requestor's MMS 111. Echo mode allows for the automatic removal of metadata used by the Contributor and assignment by the Requestor of relevant metadata to the transferred media records.

Figure 11B:
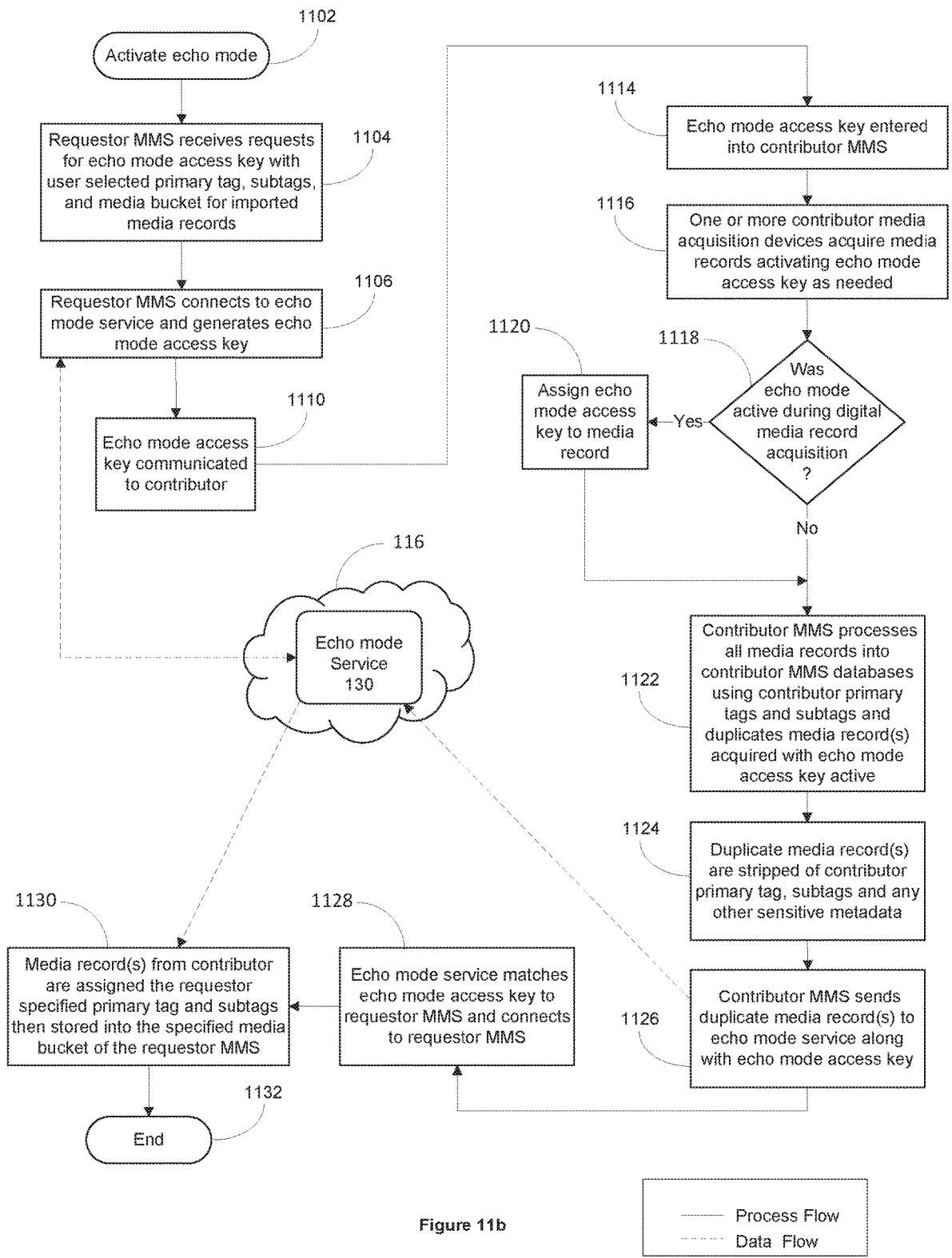
FIG. 11b is a flow diagram describing a basic exemplary implementation of the echo mode process.

FIG. 11b is a flow diagram describing a basic exemplary implementation of the echo mode process. For example, a general contractor may implement echo mode when requiring a sub-contractor, such as an electrician, to provide specific media documentation related to an electrical installation. Typically, for echo mode to be utilized, both parties use an MMS 111 and subscribe to an echo mode service 130 typically connected through a network 116.

The process begins when echo mode is activated 1102 on the general contractor's MMS 111. In operation 1104, the general contractor (Requestor) identifies the storage location such as a media bucket and metadata related to the specified documentation activity such as primary tag and subtags, and requests an echo mode access key from Requestor's MMS 111. In operation 1106, the general contractor's MMS 111 connects with an echo mode service 130 typically through a network 116 and collaborates to generate a unique access key such as, but not limited to, a string of alpha-numeric characters herein referred to as an echo mode access key. The general contractor's MMS 111 then sends the echo mode service 130 access credentials to the general contractor's MMS 111 to allow imported media records to be transferred into the media bucket specified by the general contractor. In operation 1110, the unique echo mode access key is communicated to the sub-contractor (Contributor) to be used with the electrical installation documentation activity.

In operation 1114, the general contractor's echo mode access key is entered into the sub-contractor's MMS 111. The echo mode access key may be assigned to one or more of the sub-contractor's media acquisition devices 104. During acquisition, the echo mode on the sub-contractor's acquisition device is activated as needed 1116. When the echo mode is active 1118, each media record acquired is assigned the echo mode access key 1120 in addition to all of the sub-contractor's typical metadata such as, but not limited to, primary tag and subtags.

In operation 1122, the sub-contractor's MMS 111 stores media records into the sub-contractor's MMS databases 434 using the sub-contractor's metadata and also examines each acquired media record to determine if it has also been assigned the echo mode access key. If a media record has been assigned an echo mode access key, the media record is duplicated. In operation 1124, duplicate media records are stripped of sub-contractor (contributor) specific metadata relevant only to the sub-contractor such as, but not limited to, primary tag, subtag, account number, User ID, and any other private or potentially sensitive metadata. Non-sub-contractor specific metadata such as, but not limited to, media record acquisition value and geocoordinate metadata can be transferred with the media record.

Once each duplicate media record is stripped of sub-contractor specific metadata, the sub-contractor's MMS 111 sends the duplicate media record to echo mode service 130 typically through a network 116 with the echo mode access key provided by the general contractor 1126.

The echo mode service 130 matches the echo mode access key, received with the sub-contractor's media records, to the general contractor's echo mode access key 1128. When a match is found, the echo mode service 130 uses the general contractor's MMS 111 access credentials associated with the echo mode access key to login to the general contractor's MMS 111 and collaborates with the MMS 111 to assign the metadata provided by the general contractor at the time the echo mode access key was originally requested to the imported media records. The media records are then typically stored in the general contractor's MMS databases 434 in the specified media bucket allocation 1130. Process ends with operation 1132.

Echo mode may include conditional functionalities such as, but not limited to: the ability for the Contributor to assign an echo mode access key exclusively to a specified primary tag such that the echo mode access key would not be assigned to any media records that were not also assigned the specified primary tag; limiting a specific echo mode access key generated by a Requestor to one activation such that if a Contributor who activated the echo mode access key in their MMS 111 forwarded the echo mode access key to a second Contributor, the echo mode access key would not activate in the second Contributor's MMS 111; the ability to have an echo mode access key expire after a specific point in time; the ability to temporarily store media records with an assigned echo mode access key into a holding storage area before exporting or importing from the Contributor MMS 111 or Requestor MMS 111 respectively until reviewed and either individually approved or deleted for transfer; the ability to restrict transfer of media records between MMS 111 to only those media record acquired within a specified geospatial area.

In the case where both MMS systems are using a cloud-based multimedia management service, at least one other exemplary implementation of the service can be considered in which physical duplication of media records assigned the echo mode access key is avoided. Instead, a single instance of a media record with an assigned echo mode access key is stored in the multimedia management service 130 media database 124 and the system database 128 records the media record as belonging to both systems and indexes the metadata and media bucket for, and permissions to, the media record such that each party access the record through their own specified media bucket and receives their own metadata and permission restrictions when attempts are made to access the record. In such a schema, the media record can only be deleted from the media database 124 after all parties with media record delete permissions have requested deletion of the media record.

(GUEST MODE) The MMS 111 may provide a device sharing capability through utilizing a guest login process. This allows employees in the same company to log into the system using any mobile devices that have been added to the MMS system. For example, if a registered device is lost or stolen, another registered device can be used temporarily. By entering a guest login, the guest user's information will be saved to any media that is acquired on the borrowed device. This allows the use of temporary replacement devices and the ability of workers to share devices. An emergency mode can also temporarily authorize an unrecognized phone to enable limited MMS 111 functionality for a brief period.

(MANAGEMENT CONSOLE) MMS 111, allows for customized advanced controls and settings using an application herein referred to as the Management Console. The Management Console 130 provides easy access to system tools and parameters using a tab-style approach. Each tab identifies a topic specific to user-definable MMS 111 operations. Tabs include tools for managing media storage, formatting tag names, managing user permissions, setting up media buckets, setting up subtag lists, etc.

(STORAGE MANAGER) The MMS 111 storage manager tool can be used for managing the overall storage requirements as media histories expand. Current storage usage as well as projections of future storage usage based on historic consumptions patterns are available in simple graphic representations. The system administrator 134 can manually adjust the total storage available or set the system to automatically add incremental storage when the current allocation is exceeded. Options are available for archiving and deleting content beyond a specified age. An export function is also available that allows online content past a certain age to be moved or backed up to local storage to minimize online storage costs or for archival purposes.

(PRIMARY TAG NAME TEMPLATE BUILDER) The MMS tag name template builder includes a graphical template for a primary tag name format that allows specific characters to either be prefilled or error checked for character type (i.e., numeric only, alpha only, any character, etc.). By either typing characters directly into their assigned position or graphically dragging character type blocks into each character position, the system can be setup to screen tag name input for consistency with a specific format.

(ASSIGNABLE PERMISSION LEVELS) From the management console 130, the MMS 111 can be configured to assign permission levels to users individually and/or based on job position, class, assignment, or the like. For example, in addition to a required System Admin 134 category, other categories could include: Senior Executive, Manager, 1$^{st}$ level employee, etc. Each category can be given specific access to features, functions and media buckets. Features and functions assigned at this level will effectively override global settings enabled during initial setup.

The MMS 111 may provide permission level templates for small and large business to assist a system administrator 134 in quickly setting up typical configurations based on conventional job functions. Modifications can then be made to customize the configuration to the exact needs of the organization. The modified configuration can then be saved to the MMS for immediate activation.

(CENTRALIZED DEVICE MANAGEMENT) The management console 130 also provides tools for the centralized management of multiple authorized mobile devices. IMEI and ICCID numbers are recorded for each authorized mobile device as well as the current software version of the mobile app and the date the mobile device was authorized. A "suspend" control allows mobile devices that are lost or stolen to be "de-authorized" blocking them from accessing the system even if the SIM card is replaced.

From the management console 130, authorized personnel may view media acquired by one or more users/devices throughout the day. For example, media may be displayed in a mediastrip next to the contributor's name/ID. This quickly provides a manager with a real-time reference as to how each assignment is progressing and if media requirements are being met.

(REAL-TIME MEDIA VIEWER) MMS 111 may support an application referred to as Real-time Media Viewer. An example of how this application could be used is as a front-office feature that shows the latest media acquired from mobile users on a large screen display or TV 119. Providing real-time feedback to potential clients by documenting the quality and integrity of work being done in the field could be a valuable sales tool. Used as a back-office tool, the viewer allows people collecting data in the field to realize their work is published within the organization where it can be observed and appreciated rather than being stored in a computer never to be seen again.

At the highest level, the core value of this MMS system is the ability to make the acquisition and extraction of media so efficient that the benefits of collecting, identifying and extracting media content far exceeds the total cost of implementing and managing the system. Moreover, a sophisticated configuration system ensures a very high level of systematic control over media collection and access that allows the system to be tailored to specific business or personal needs.

Hardware and Software

Figure 13:
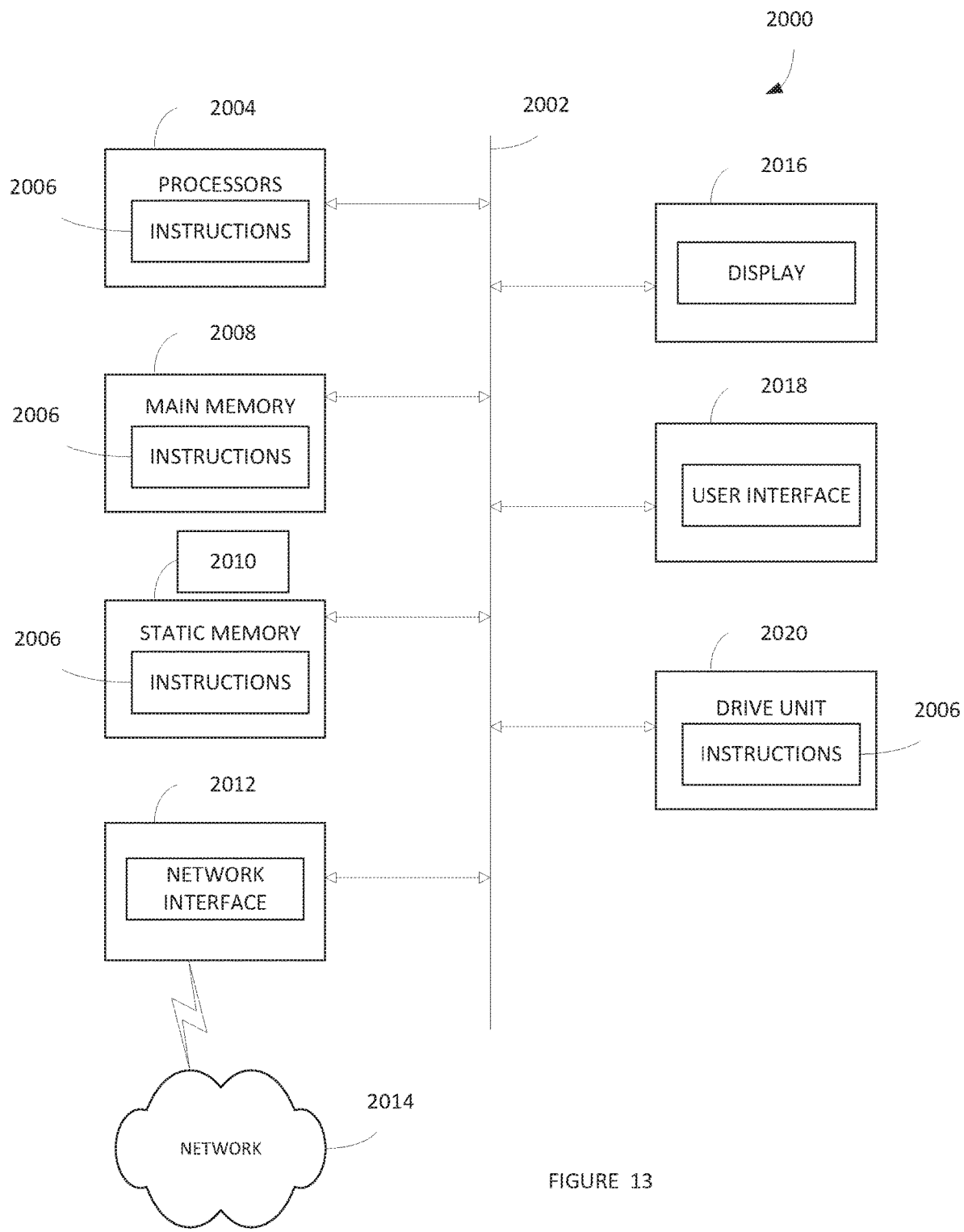
FIG. 13 shows a computer system used for implementing the MMS.

FIG. 13 shows a computing device 2000 used for operating the MMS 111 discussed above. The computing device 2000 may operate in the capacity of a server or a client machine in a server-client network environment, or as a peer machine in a peer-to-peer (or distributed) network environment. In other examples, computing device 2000 may be a personal computer (PC), a tablet, a Personal Digital Assistant (PDA), a cellular telephone, a smart phone, a web appliance, or any other machine or device capable of executing instructions 2006 (sequential or otherwise) that specify actions to be taken by that machine.

While only a single computing device 2000 is shown, the computing device 2000 may include any collection of devices or circuitry that individually or jointly execute a set (or multiple sets) of instructions to perform any one or more of the operations discussed above. Computing device 2000 may be part of an integrated control system or system manager, or may be provided as a portable electronic device configured to interface with a networked system either locally or remotely via wireless transmission.

Processors 2004 may comprise a central processing unit (CPU), a graphics processing unit (GPU), programmable logic devices, dedicated processor systems, micro controllers, or microprocessors that may perform some or all of the operations described above. Processors 2004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 2004 may execute instructions or "code" 2006 stored in any one of memories 2008, 2010, or 2020. The memories may store data as well. Instructions 2006 and data can also be transmitted or received over a network 2014 via a network interface device 2012 utilizing any one of a number of well-known transfer protocols.

Memories 2008, 2010, and 2020 may be integrated together with processing device 2000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 2000 can further include a video display 2016, such as a liquid crystal display (LCD), light emitting diode (LED), organic light emitting diode (OLED), or a cathode ray tube (CRT) and a user interface 2018, such as a keyboard, mouse, touch screen, etc. All of the components of computing device 2000 may be connected together via a bus 2002 and/or network.

The system described above can use dedicated processor systems, micro controllers, programmable logic devices, or microprocessors that perform some or all of the operations. Some of the operations described above may be implemented in software, such as computer readable instructions contained on a storage media, or the same or other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

References above have been made in detail to preferred embodiment. Examples of the preferred embodiments were illustrated in the referenced drawings. While preferred embodiments where described, it should be understood that this is not intended to limit the invention to one preferred embodiment. To the contrary, it is intended to cover alternatives, modifications, and equivalents as may be included within the spirit and scope of the invention as defined by the appended claims.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A method for displaying media records in parallel mediastrips, comprising:
   identifying a plurality of media records, the set of media records comprised of a plurality of media types with each media record of the plurality of media records represented by one thumbnail, wherein the plurality of media records are divided into a plurality of subgroups that are each represented by a thumbnail in mediastrips where the thumbnails in each mediastrip are further organized into time sequential order based on the creation date of their associated media record;
   displaying multiple separate but parallel mediastrips separately and simultaneously in a display area of a user interface (UI) where each mediastrip represents one of the subgroups of media records and where a scrollable display area of each mediastrip is aligned such that boundaries of the scrollable display area associated with a newest displayed thumbnail for each mediastrip are vertically aligned above and below each other in the UI;
   presenting, by the UI, an independent mediastrip format option to display the thumbnails in each mediastrip in time sequential order, with uniform display spacing between thumbnails, and allow the user to scroll each of the mediastrips independently to review all the thumbnails within each mediastrip regardless of display area constraints;
   presenting, by the UI, a multiple-mediastrip, matrix-centric thumbnail format display option that maintains a sequential order of each thumbnail in each mediastrip while the time sequential order of all thumbnails across all mediastrips is presented in time sequential columns of thumbnails such that:
      a number of thumbnails in a column can range from 1 to n, where n equals the number of mediastrips;
      no more than one thumbnail from each mediastrip can be placed in a column;
      thumbnails in each column represent the next time sequential thumbnail in the sequence of thumbnails regardless of a thumbnail's position in the column;

each thumbnail in the column must maintain its sequential order in its associated mediastrip which may or may not require non-uniform spacing within its mediastrip;

spacing between thumbnail columns is uniform except to emphasize a specific column;

for any thumbnail column, all content in an adjacent thumbnail column must either be all newer or all older; and any scrolling action of one of the mediastrips causes all media strips to scroll at an equal rate to maintain a column thumbnail structure of the format and allow the user to review all the thumbnails for the plurality of media records regardless of display area constraints;

displaying a simple mediastrip format control in the UI that allows the user to switch between the independent and matrix-centric thumbnail format options; and providing a persistent thumbnail selection function that allows the user to select or unselect one thumbnail in any one of the subgroup mediastrips such that when selected, the thumbnail will stay selected if the mediastrip format option is changed to the matrix-centric format, and will scroll the resulting reformatted mediastrip to ensure the selected thumbnail and the thumbnail columns preceding and following the thumbnail column of the selected thumbnail are visible, ensuring thumbnails representing any media records created before and after the media record for the selected thumbnail will be visible regardless of which mediastrip they are located in, and the thumbnail will stay selected and visible if the mediastrip format option is changed back to the independent format.

2. The method of claim 1, including:
identifying time values for media identifiers indicating when the represented media records were acquired;
comparing differences in the time values for adjacent media identifiers in the same mediastrips; and
displaying time gap indicators between the adjacent media identifiers when the differences in the time values are equal or above a time gap value.

3. The method of claim 1, including:
displaying a media timeline that includes one or more mediastrips wherein a first end of the timeline indicates an oldest acquisition value for one of the media records and a second opposite end of the timeline indicates a newest acquisition value for one of the media records or a current date; and
displaying markers on the media timeline indicating the acquisition values for the media records.

4. The method of claim 1 including:
displaying a media timeline that includes one or more mediastrips on the UI indicating acquisition values for the media records; and
displaying multi-record indicators on the media timeline representing multiple media records, wherein the multi-record indicators are displayed when a visual resolution of the media timeline causes the multiple media records to occupy substantially the same position on the media timeline.

5. The method of claim 1, including:
displaying a media timeline that includes one or more mediastrips on the UI indicating acquisition values for the media records;
displaying an image on the media timeline representing a group of the media records;

receiving a selection of the image;
displaying an enlarged portion of the media timeline covered by the selected image; and
displaying at least one of:
markers on the enlarged portion of the media timeline indicating the acquisition values for the group of the media records, or
another image in the enlarged portion representing a subgroup for the group of media records.

6. The method of claim 5, including displaying on the UI portions of the mediastrips with media identifiers representing the group or subgroup of media records.

7. The method of claim 1, including:
displaying a media timeline indicating acquisition values for the media records;
detecting selection of a time on the media timeline; and
displaying a portion of the mediastrips representing the media records acquired within a defined time period of the selected time.

8. The method of claim 1, including:
detecting the selection of a media identifier on one of the mediastrips; and
display a marker on a media timeline indicating acquisition values for one of the media records associated with the selected one of the media identifiers.

9. The method of claim 1, including:
displaying a marker on a media timeline indicating a newest one of acquisition values for one the media records represented in a currently displayed portion for an identified one of the mediastrips;
receiving an input scrolling the identified one of the mediastrips; and
updating the marker on the media timeline indicating the newest one of the acquisition values for one of the media records represented in a currently displayed portion of the scrolled one of the mediastrips.

10. The method of claim 1, including:
displaying a media timeline indicating acquisition values of the media records represented in one of the mediastrips;
detecting an input scrolling the timeline;
identifying a date on the media timeline corresponding to a contact point of the input as the input progresses along the timeline; and
scrolling one or more of the mediastrips to show media identifiers with media record acquisition values closest to the date identified on the media timeline.

11. The method of claim 1, including:
identifying acquisition values associated with the thumbnails located in the same thumbnail column;
identifying time gaps between the chronologically sequential acquisition values in each of the thumbnail columns beginning with the newest or oldest media record in the thumbnail column;
identifying time gaps between the chronologically sequential acquisition values;
moving the thumbnails with time gaps equal or greater than a time gap value to the adjacent thumbnail columns; and
displaying an indicator between the adjacent thumbnail columns.

12. The method of claim 1, including:
identifying acquisition values associated with chronologically sequential thumbnails located in the adjacent thumbnail columns; and
displaying an indicator between the adjacent thumbnail columns when time gaps between chronologically sequential acquisition values in the adjacent thumbnail columns are equal or greater than a configured time gap value.

13. The method of claim 1, including:

receiving a user identifier;

identify the media records with metadata tags including the user identifier; and displaying only the media records with metadata tags including the user identifier.

14. An echo mode service, comprising:

a processor configured to:

receive from a requestor media management service (MMS) a user selected metadata tag of a first tier identifying a collection of media records to be subsequently created by a contributor MMS;

generate a unique echo mode access key which is communicated to both the requestor MMS and the contributor MMS;

receive from the contributor MMS either media records, or indicators of media records, available for transfer that are associated with the unique echo mode access key;

remove any metadata tags assigned by the contributor MMS that are specific to the contributor MMS from any media records associated with the requestor MMS echo mode access key prior to transfer to the requestor MMS;

assign the first tier metadata tag provided by the requestor MMS and assigned to the unique echo mode access key to all media records that are associated with the unique echo mode access key prior to transfer of the media records in the requestor MMS; and transfer the media records associated with the unique echo mode access key from the contributor MMS to the requestor MMS as they are created and become available to the echo mode service.

15. The echo mode service of claim 14, wherein the echo mode access key causes the contributor MMS to strip contributor-specific metadata tags from the media records.

16. The echo mode service of claim 14, wherein the contributor MMS restricts use of the echo mode access key to specified contributor metadata tags assigned to the media records.

17. The echo mode service of claim 14 wherein the echo mode access key is limited to activation on only one contributor MMS system.

18. The echo mode service of claim 14, wherein the requestor metadata tags include:

primary metadata tags identifying primary categories of media segmentation; and secondary metadata tags identifying sub-categories for the primary categories of media segmentation.

19. The echo mode service of claim 14, wherein at least one of the requestor and contributor MMS holds duplicate media records for review before the duplicate media records are made available to the requestor MMS.

20. The echo mode service of claim 14, wherein the echo mode access key automatically invalidates after a specified time.

21. The echo mode service of claim 14, wherein the echo mode access key automatically invalidates if a contributor acquisition device operates outside a specified geospatial area.

* * * * *